(12) United States Patent
Tani

(10) Patent No.: US 6,982,761 B1
(45) Date of Patent: Jan. 3, 2006

(54) DEVICE FOR CAPTURING THREE-DIMENSIONAL IMAGES WITH INDEPENDENTLY CONTROLLABLE GROUPS OF PHOTOELECTRIC CONVERSION ELEMENTS

(75) Inventor: Nobuhiro Tani, Tokyo (JP)

(73) Assignee: PENTAX Corporation, Tokyo (JP)

( * ) Notice: Subject to any disclaimer, the term of this patent is extended or adjusted under 35 U.S.C. 154(b) by 845 days.

(21) Appl. No.: 09/589,064

(22) Filed: Jun. 8, 2000

(30) Foreign Application Priority Data

Jun. 9, 1999 (JP) ............................. P11-162889
Jun. 23, 1999 (JP) ............................. P11-176968

(51) Int. Cl.
*H04N 5/232* (2006.01)

(52) U.S. Cl. .................... 348/348; 348/362; 348/230.1

(58) Field of Classification Search ................ 348/348, 348/311, 312, 314, 315, 317, 319, 320, 322, 348/208.14, 362, 230.1; 396/96; 250/559, 250/38, 206.1, 206.2; 356/601
See application file for complete search history.

(56) References Cited

U.S. PATENT DOCUMENTS

| | | | | |
|---|---|---|---|---|
| 4,539,598 A | * | 9/1985 | Dietrich et al. ............. | 348/319 |
| 4,686,572 A | | 8/1987 | Takatsu | |
| 4,915,498 A | * | 4/1990 | Malek ........................ | 356/5.04 |
| 5,081,530 A | | 1/1992 | Medina | |
| 5,512,997 A | | 4/1996 | Ogawa | |
| 5,541,654 A | * | 7/1996 | Roberts ....................... | 348/301 |
| 5,627,586 A | * | 5/1997 | Yamasaki ................... | 348/169 |
| 6,057,909 A | * | 5/2000 | Yahav et al. ............... | 356/5.04 |
| 6,292,169 B1 | * | 9/2001 | Numazaki et al. .......... | 345/156 |
| 2002/0145669 A1 | * | 10/2002 | Umeda et al. ........... | 348/220.1 |

FOREIGN PATENT DOCUMENTS

| | | |
|---|---|---|
| JP | 4351074 | 12/1992 |
| WO | 97/01111 | 1/1997 |

OTHER PUBLICATIONS

"Design and Development of a Multi-Detecting Two-Dimensional Ranging Sensor", S. Christie et al., Measurement Science and Technology, vol. 6, pp. 1301-1308, published Jun. 6, 1995.
English Language Translation for JP Appln. No. 4-351074.

* cited by examiner

*Primary Examiner*—David L. Ometz
*Assistant Examiner*—Heather R. Jones
(74) *Attorney, Agent, or Firm*—Greenblum & Bernstein, P.L.C.

(57) ABSTRACT

A three-dimensional image capturing device comprises an imaging device, such as a CCD, having a plurality of photo-diodes, a vertical transfer unit and a substrate. The plurality of photo-diodes is separated into a plurality of groups and each of the groups can be controlled independently. A distance measuring light beam having a predetermined pulse width is radiated to a measurement subject and a reflected light beam, generated by the measurement subject due to the distance measuring light beam, is sensed by the photo-diodes, so that a distance information sensing operation which detects distance information of the measurement subject is executed. In the distance information sensing operation, only predetermined groups of the photo-diodes are used for sensing the distance information, while in an image information sensing operation, which detects an image of the measurement subject, all photo-diodes in the CCD are used.

6 Claims, 23 Drawing Sheets

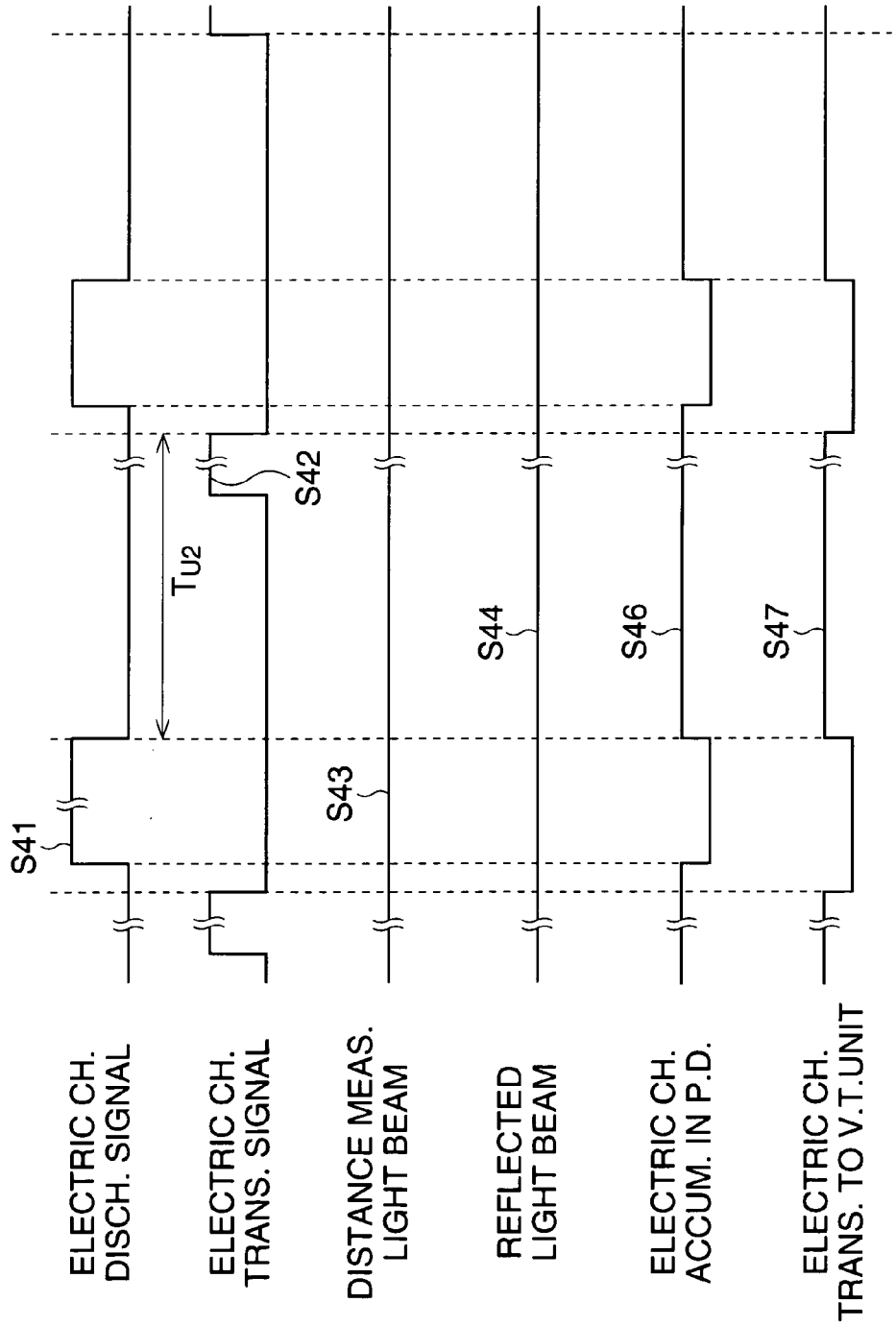

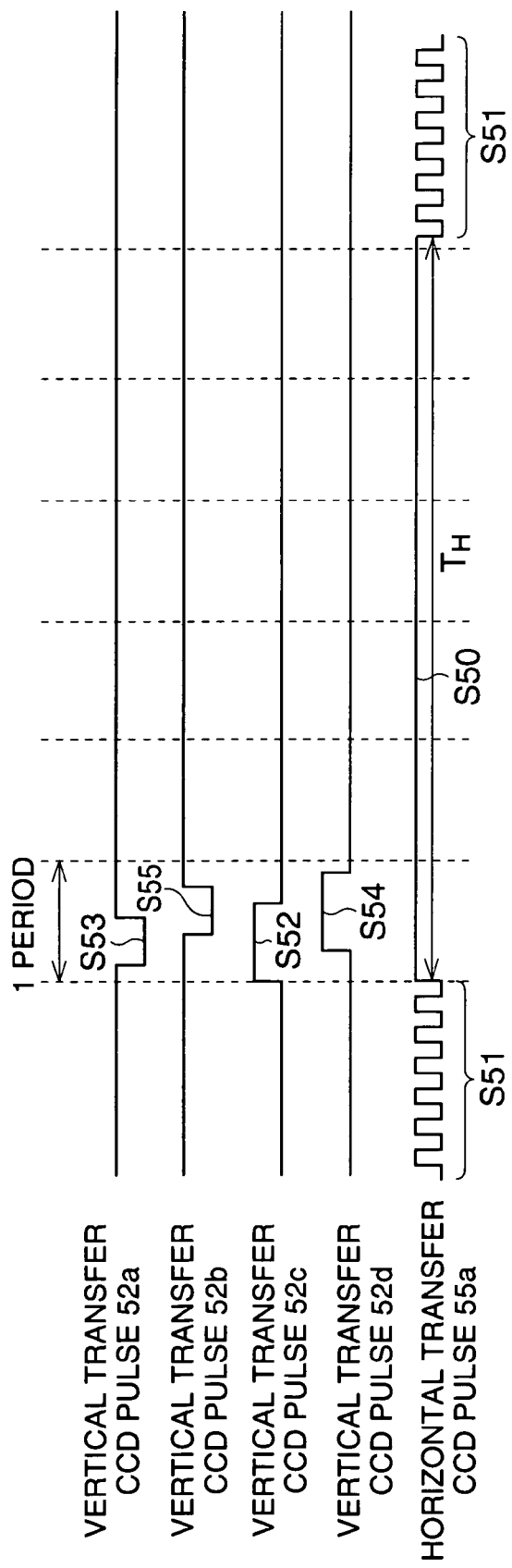

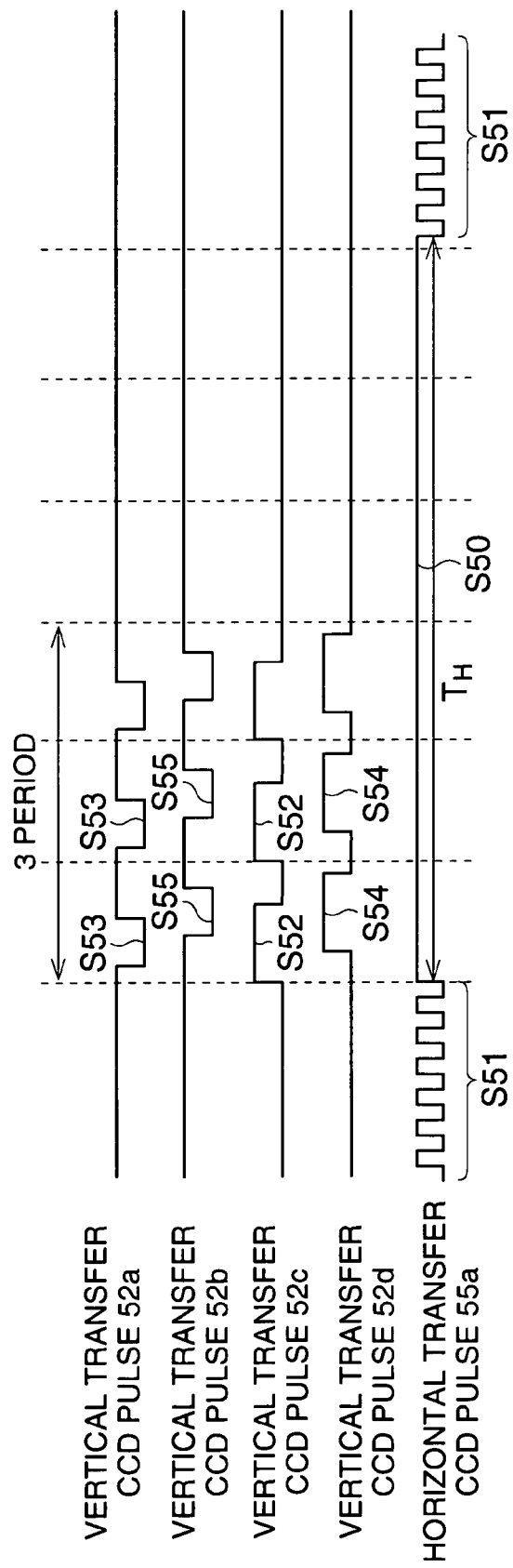

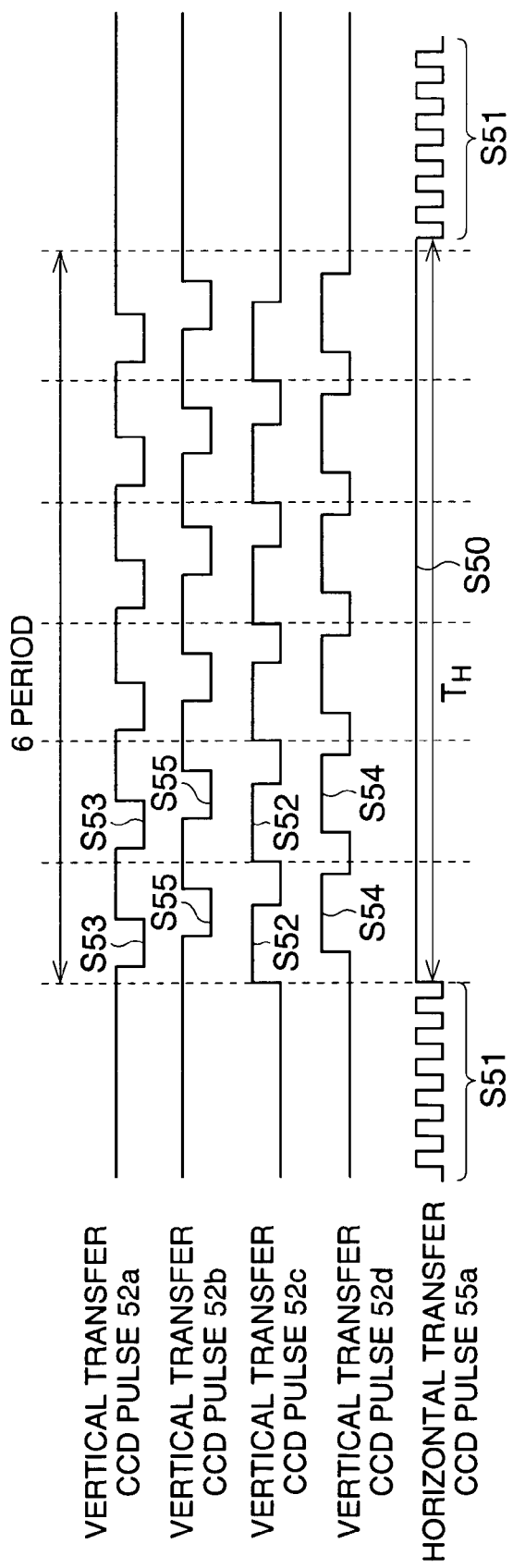

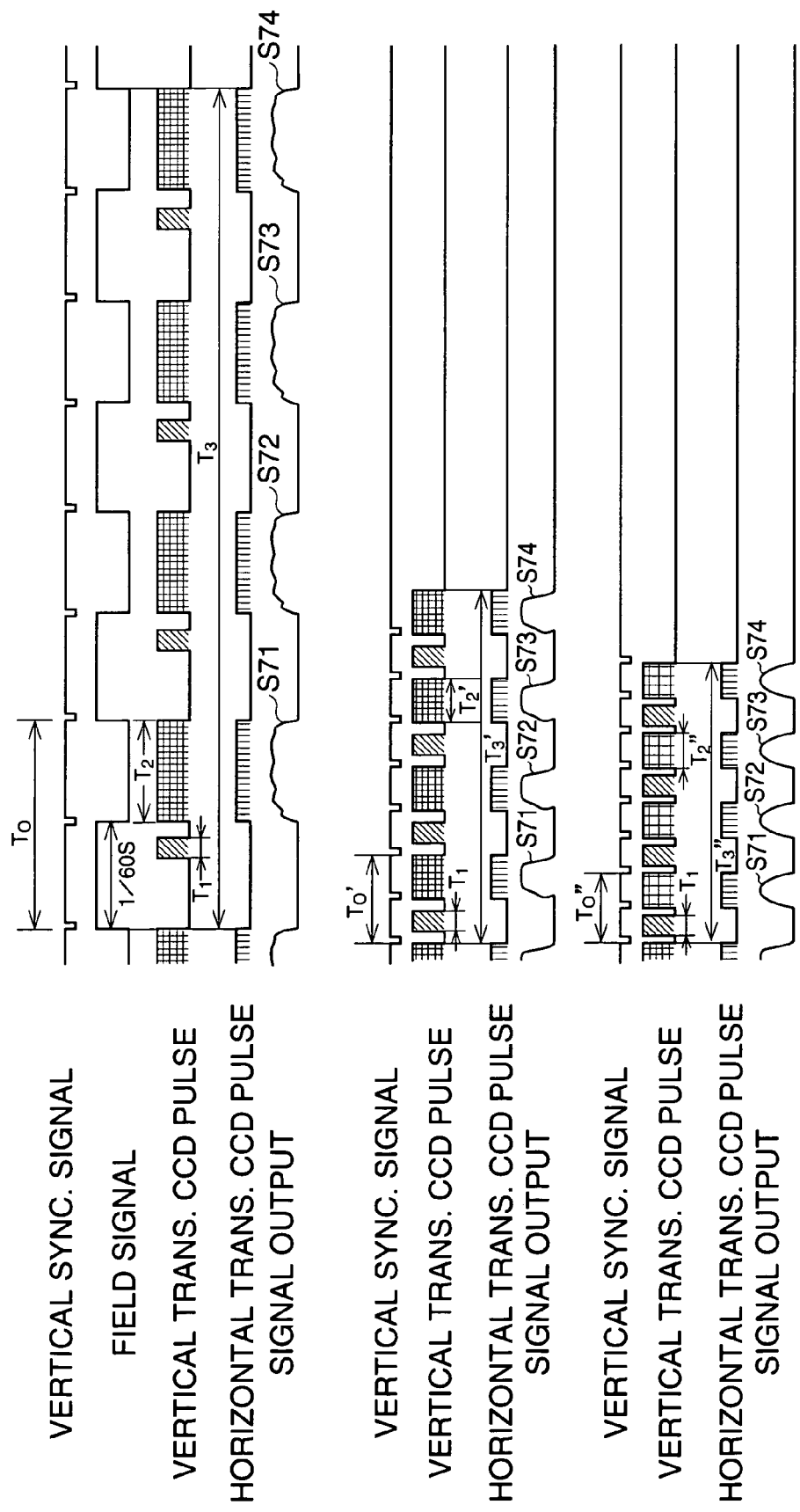

DEVICE FOR CAPTURING THREE-DIMENSIONAL IMAGES WITH INDEPENDENTLY CONTROLLABLE GROUPS OF PHOTOELECTRIC CONVERSION ELEMENTS

BACKGROUND OF THE INVENTION

1. Field of the Invention

The present invention relates to a three-dimensional image capturing device by which a three-dimensional shape of a measurement subject, which is to be measured, is captured by a time-of-flight measurement.

2. Description of the Related Art

A three-dimensional measurement using a three-dimensional image capturing device is classified as an active system, in which light, an electric wave or sound is radiated onto a measurement subject, and a passive system in which the light, electric wave or sound is not output. The active system comprises the time-of-flight measurement, a phase detection using a modulated light wave, a triangulation, a moirétopography, and so on, and the passive system comprises a stereo vision system, and so on.

An active system device is bulky in comparison with that of the passive system, since the device requires a laser beam output mechanism. However, the active system device is superior regarding a distance measurement resolution, a measuring time, a measuring range and so on, and thus, despite the bulkiness, the device is utilized in various fields. In a three-dimensional image capturing device, described in "Measurement Science and Technology" (S. Christie et al., vol. 6, p. 1301–1308, 1995), a pulse-modulated laser beam irradiates a measurement subject, and a reflected light beam, which is reflected by the measurement subject, is received by a two-dimensional CCD sensor to which an image intensifier is attached, so that an image signal, corresponding to the reflected light beam, is converted to an electric signal. ON-OFF control of the image intensifier is carried out by a gate pulse, which is synchronized with the pulse radiation of the laser beam. According to the device, since an amount of received light, based on the reflected light beam from the measurement subject, which is positioned far from the device, is less than that of received light based on a reflected light beam from a measurement subject, which is close to the measurement subject, an output corresponding to a distance between the measurement subject and the device can be obtained for each pixel of the CCD.

In a device disclosed in International Publication No. WO 97/01111, light, such as a laser beam, which is pulse-modulated, irradiates a measurement subject, and a reflected light beam, which is reflected by the measurement subject, is received by a two-dimensional CCD sensor which is assembled with a mechanical shutter or an electro-optical shutter formed by a liquid crystal display, so that an image signal corresponding to the reflected light beam is converted to an electric signal. The shutter is controlled at a timing which is different from that of the laser beam, so that distance information of the measurement subject is obtained for each pixel of the CCD.

In the conventional three-dimensional image capturing device of an active system described above, an optical shutter, such as a KDP element, is provided so that an electric charge accumulating operation in the CCD sensor is controlled. However, not only is the optical shutter bulky, but also an electric circuit, which outputs a high voltage to drive the optical shutter, should be provided, and thus the conventional device becomes and remains bulky.

On the other hand, in U.S. Pat. No. 5,081,530, a device, in which an electronic shutter is provided for controlling an electric charge accumulating operation of a CCD sensor, is disclosed. However, an output of the CCD sensor, which is obtained by a single operation of the electronic shutter, is not great enough to sense distance information of the measurement subject.

SUMMARY OF THE INVENTION

Therefore, an object of the present invention is to provide, at a moderate price, a miniaturized three-dimensional image capturing device, which operates without an optical shutter, and by which an output sufficient to acquire three-dimensional distance information of the measurement subject is obtainable even when a high definition CCD is used so as to detect a high definition image of the subject.

Further another object of the present invention is to provide a three-dimensional image capturing device by which three-dimensional distance information of the high speed moving subject is detectable.

According to the present invention, there is provided a three-dimensional image capturing device, comprising a light source, a plurality of first and second photoelectric conversion elements, a first and a second electric charge holding units, a first and a second electric charge transfer processors and an electric charge integrating processor.

The light source radiates a distance measuring light beam irradiating a measurement subject. The measurement subject reflects the distance measuring light beam to generate a reflected light beam. The first and second photoelectric conversion elements receive the reflected light beam, so that electric charge corresponding to an amount of the received reflected light beam is accumulated in each of the photoelectric conversion elements. The first and second electric charge holding units are disposed adjacent to each of the first and second photoelectric conversion elements, respectively. The first and second electric charge transfer processors transfer the electric charge accumulated in each of the first and second photoelectric conversion elements to each of the first and second electric charge holding units with first and second electrodes connected only to each of the first and second electric charge holding units respectively. The electric charge integrating processor drives the first electric charge transfer processor repeatedly, so that electric charge accumulated in the first photoelectric conversion elements is integrated in the first electric charge holding unit.

Preferably, the device further comprises a first and second electric charge discharging processor. The first and second electric charges discharging processor discharges unwanted charge accumulated in each of the first and second photoelectric conversion elements, so that an accumulating operation of electric charge are started in each of the first and second photoelectric conversion elements. And the electric charge integrating processor is operated by driving the first electric charge discharging processor and the first electric charge transfer processor alternately.

Further, according to the present invention, there is provided a three-dimensional image capturing device, comprising a light source, a plurality of optical sensors, electric charge transfer electrodes, an electric charge transfer unit, an electric charge transfer electrode control processor and an electric charge accumulating processor.

The light source radiates a distance measuring light beam irradiating a measurement subject. The measurement subject reflects the distance measuring light beam to generate a reflected light beam. The optical sensors receive the reflected light beam, so that electric charge corresponding to an amount of the received reflected light beam is generated in each of the optical sensors.

The plurality of optical sensors generates electric charge corresponding to an amount of light received by the optical sensors and is separated into predetermined groups. The electric charge transfer electrodes are applied to each of the optical sensors in order to transfer the electric charge generated in the optical sensors to the outside of the optical sensors. The electric charge transfer unit holds the electric charge transferred from the optical sensors by the electric charge transfer electrodes and transports the electric charge held in the electric charge transfer unit. The electric charge transfer electrode control processor controls each group of the electric charge transfer electrodes independently. The generated electric charge accumulating processor repeatedly drives the electric charge transfer electrode control processor and transfers electric charge generated in certain groups of the optical sensors, so that transferred electric charge accumulates in the electric charge transfer unit.

According to another aspect of the present invention, there is provide a three-dimensional image capturing device comprising a light source, a plurality of photoelectric conversion elements, a vertical transfer unit, a horizontal transfer unit, an electric charge transfer processor, an electric charge integrating processor and a transfer operation control processor.

The light source radiates a distance measuring light beam irradiating a measurement subject, so that the measurement subject reflects the distance measuring light beam to generate a reflected light beam. The plurality of photoelectric conversion elements is disposed in a matrix arrangement and receives the reflected light beam, so that electric charge corresponding to an amount of the received reflected light beam is accumulated in each of the photoelectric conversion elements. The vertical transfer unit is disposed along each vertical line of the photoelectric conversion elements, so that the electric charge accumulated in the photoelectric conversion elements is transferred in a vertical direction. The horizontal transfer unit is disposed nearby one end of the vertical transfer unit and in parallel with horizontal lines of the photoelectric conversion elements, so that the electric charge is transferred in a horizontal direction. The electric charge transfer processor can transfer electric charge accumulated only in photoelectric conversion elements that comprises in effective horizontal lines, which are disposed every predetermined number of lines in the horizontal lines. The electric charge integrating processor drives the electric charge transfer processor repeatedly and integrates the electric charge accumulated in the photoelectric conversion elements comprising the effective horizontal lines in the vertical transfer unit. The transfer operation control processor controls the horizontal transfer unit and the vertical transfer unit, so that the horizontal transfer unit is driven only when the electric charge corresponding to the effective horizontal lines is transferred to the horizontal transfer unit.

Further, according to the present invention, there is provided a three-dimensional image capturing device comprising a light source, a plurality of photoelectric conversion elements, an electric charge transfer control processor, a distance calculating processor and a first and second distance measuring processor.

The light source radiates light irradiating a measurement subject. The plurality of photoelectric conversion elements is disposed in a matrix arrangement and can accumulate electric charge corresponding to an amount of light received by the photoelectric conversion elements. The electric charge transfer control processor controls an electric transfer operation, which outputs electric charge accumulated in the photoelectric conversion elements to the outside of the photoelectric conversion elements. The distance calculating processor calculates a distance, from the photoelectric conversion element to the measurement subject, from an amount of electric charge accumulated in the photoelectric conversion elements, from light reflected by the measurement subject and received in the photoelectric conversion elements. The first distance measuring processor drives the electric charge transfer control processor in order to output electric charge accumulated in all the photoelectric conversion elements, and calculates distances corresponding to all the photoelectric conversion elements by means of the distance calculating processor. The second distance measuring processor drives the electric charge transfer control processor in order to output electric charge accumulated in certain partial photoelectric conversion elements, and calculates distances corresponding to the partial photoelectric conversion elements by means of the distance calculating processor.

BRIEF DESCRIPTION OF THE DRAWINGS

The objects and advantages of the present invention will be better understood from the following description, with reference to the accompanying drawings in which:

FIG. 10 is a timing chart of a reflectance correction information sensing operation;

FIGS. 19A, 19B and 19C are timing charts of vertical transfer CCD pulse and horizontal transfer CCD pulse in the Dn mode, Dh1 mode and Dh2 mode, respectively;

FIG. 20 is a timing chart of a distance measurement operation executed in Dn mode, Dh1 mode and Dh2 mode, respectively.

DESCRIPTION OF THE PREFERRED EMBODIMENTS

Figure 1:
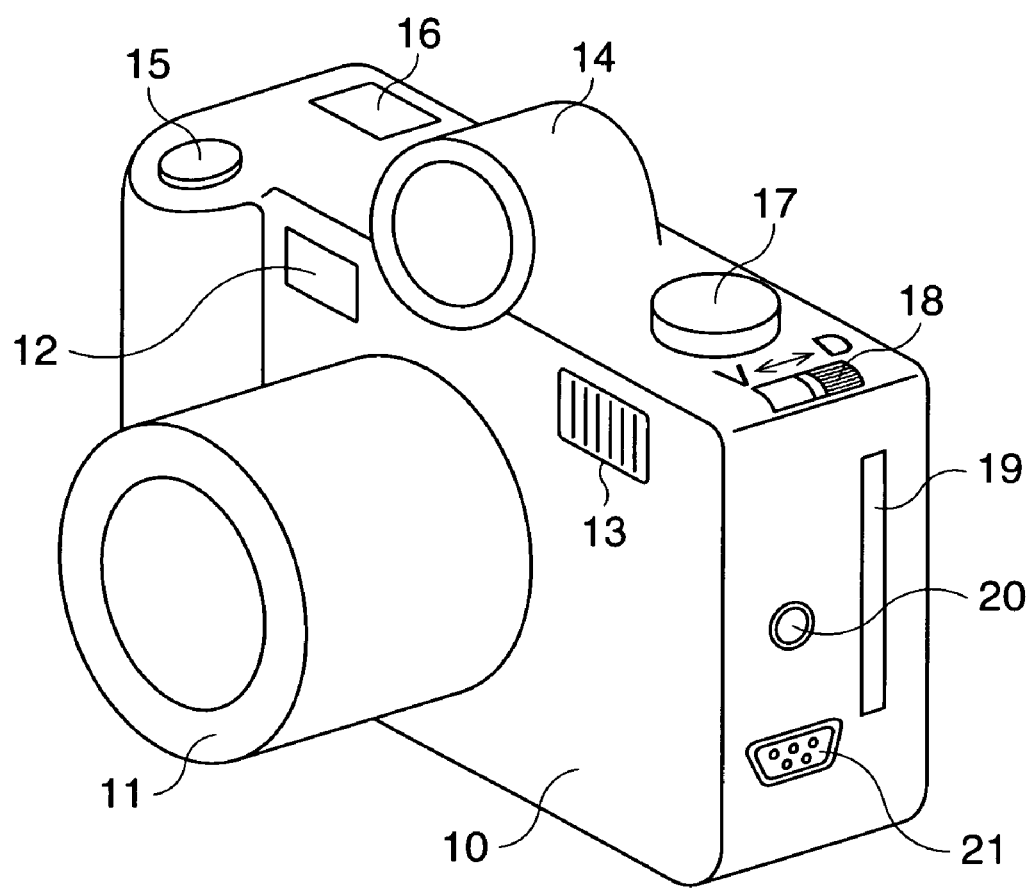
FIG. 1 is a perspective view showing a camera provided with a three-dimensional image capturing device of a first embodiment of the present invention.

The present invention is described below with reference to embodiments shown in the drawings.

FIG. 1 is an external view of an optical reader of a first embodiment of the present invention.

On a front surface of a camera body 10, a view-finder window 12 is provided toward a left-upper edge, adjacent to a photographing lens 11, and an electronic flash 13 is disposed toward a right-upper edge. On an upper surface of the camera body 10, a light emitting device (i.e., a light source) 14, which radiates a laser beam (an infrared laser beam, for example, being a distance measuring light beam) is mounted above the photographing lens 11. A release switch 15 and a liquid crystal display panel 16 are provided on a left side of the light emitting device 14, and a mode change dial 17 and a V/D mode switch 18 are provided on a right side of the device 14. On a side surface of the camera body 10, a card slot 19 is formed, into which a recording medium, such as an IC memory card, is insertable, and a video output terminal 20 and an interface connector 21 are also provided.

Figure 2:
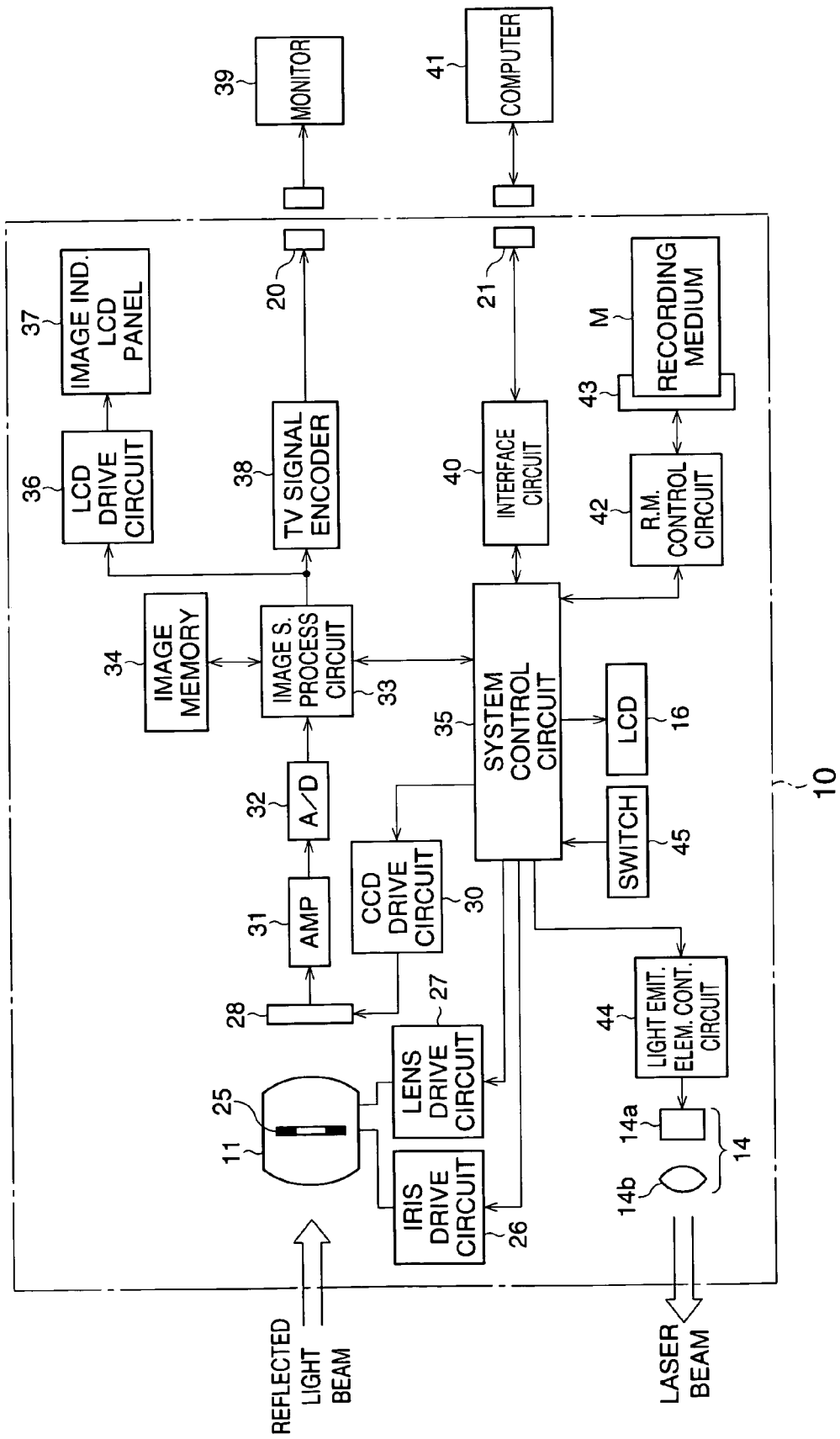
FIG. 2 is a block diagram showing an electrical construction of the camera shown in FIG. 1.

FIG. 2 is a block diagram showing an electrical construction of the camera of FIG. 1. An aperture 25 is provided in the photographing lens 11. The opening degree of the aperture 25 is adjusted by an iris drive circuit 26. A focusing operation and a zoom operation of the photographing lens 11 are controlled by a lens drive circuit 27.

An imaging device (CCD) 28 is disposed on an optical axis of the photographing lens 11. A subject image is formed on a light receiving surface of the CCD 28 through the photographing lens 11, and an electric charge corresponding to the subject image is generated therein. An operation, such as an accumulating operation and a reading operation of the electric charge of the CCD 28, is controlled by a CCD drive circuit 30. An electric charge signal, i.e., an image signal, read from the CCD 28 is amplified by an amplifier 31, and is converted from an analog signal to a digital signal by an A/D converter 32. The digital image signal is subjected to a process, such as a gamma correction, in the image signal process circuit 33, and is stored as digital image data in an image memory 34. The iris drive circuit 26, the lens drive circuit 27, the CCD drive circuit 30 and the image signal process circuit 33 are controlled by a system control circuit 35.

The digital image data are read from the image memory 34, and supplied to an LCD drive circuit 36, which is operated in accordance with the digital image data, so that an image corresponding to the digital image data is indicated on an image indication LCD panel 37.

The digital image data read from the image memory 34 are also transmitted to a TV signal encoder 38, so that the digital image data can be transmitted to a peripheral monitor device 39, provided externally to the camera body 10, through a video output terminal 20. The system control circuit 35 is connected to an interface circuit 40, which in turn is connected to an interface connector 21. Therefore, the digital image data read from the image memory 34, can also be transmitted to a computer 41 connected to the interface connector 21. Further, the system control circuit 35 is connected to an image recording device 43 through a recording medium control circuit 42. Therefore, the digital image data read from the image memory 34 can be recorded in a recording medium M, such as an IC memory card, mounted in the image recording device 43.

A light emitting element control circuit 44 is connected to the system control circuit 35. The light emitting device 14 is provided with a light emitting element 14a and an illumination lens 14b, and an operation of the light emitting element 14a is controlled by the light emitting element control circuit 44. The light emitting element 14a radiates a laser beam, which is a distance measuring light beam, and which irradiates a whole of a measurement subject through the illumination lens 14b. The laser beam, reflected by the measurement subject, becomes incident on the photographing lens 11. By detecting the laser beam with the CCD 28 provided with a plurality of photo-diodes, which are two-dimensionally disposed on a surface thereof, a three-dimensional image is sensed, as described later.

The liquid crystal display panel 16 and a switch group 45, including the release switch 15, the mode change dial 17 and the V/D mode switch 18, are connected to the system control circuit 35.

Figure 3:
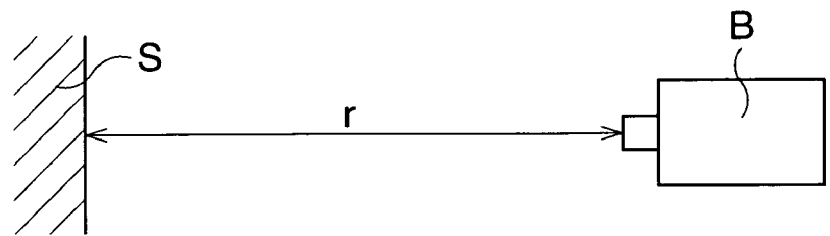
FIG. 3 is a view showing a principle behind a distance measurement.
Figure 4:
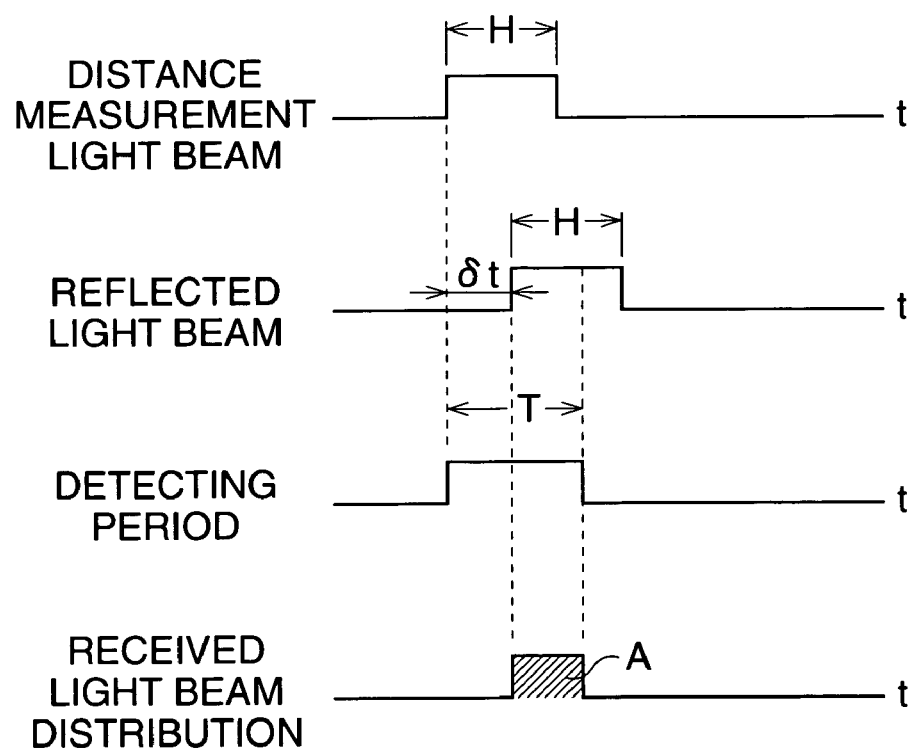
FIG. 4 is a timing chart showing a distance measurement light beam, a reflected light beam, a gate pulse and a distribution of an amount of a light beam received by a CCD.

With reference to FIGS. 3 and 4, a principle behind a distance measurement in the embodiment is described below. Note, in FIG. 4, the abscissa indicates time "t".

A distance measuring light beam output by a distance measurement device B is reflected by a measurement subject S, and the reflected light beam is sensed by a CCD (not shown). The distance measuring light beam is a pulse, the width of which is "H". Accordingly, the reflected light beam is a pulse, the width of which is "H", similarly to the distance measuring light beam. Therefore, a rise of the pulse of the reflected light beam occurs after a rise of the pulse of the distance measuring light beam by a time δ·t (δ is a delay coefficient). Since the distance measuring light beam and the reflected light beam have both traveled a distance "r" between the distance measurement device B and the measured subject S, the distance "r" is represented as follows:

$$r = \delta \cdot t \cdot C / 2 \quad (1)$$

wherein "C" is the speed of light.

For example, by setting a condition in such a manner that the reflected light beam can only be sensed from a rise of the pulse of the distance measuring light beam to a point prior to a fall of the pulse of the reflected light beam, i.e. by providing a gate pulse corresponding to a reflected light beam detecting period T, an amount "A" of received light from the reflected light beam becomes a function of the distance "r". Namely, the greater the distance "r" (or the greater the time δ·t), the less the received light amount A.

In the embodiment, by taking advantage of the principle described above, the received light amount A is sensed using each of the photo-diodes (photoelectric conversion elements) of the CCD 28, the distance from the camera body 10 to each point on the surface of the measurement subject S is sensed, and data of the three-dimensional image, which indicates a topography of the measurement subject S, can be obtained concurrently.

Figure 5:
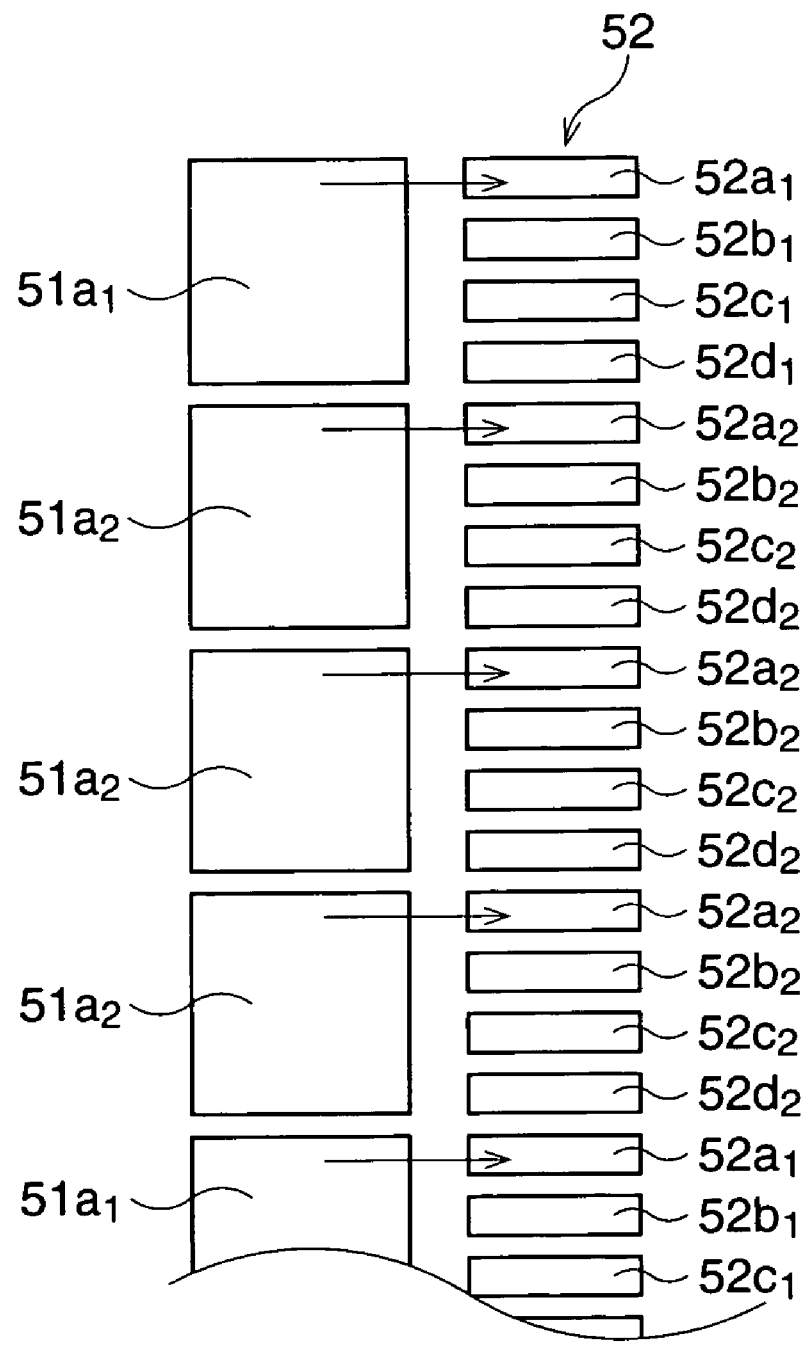
FIG. 5 is a plan view showing a disposition of photodiodes and a vertical transfer unit, which are provided in the CCD of the first embodiment.
Figure 6:
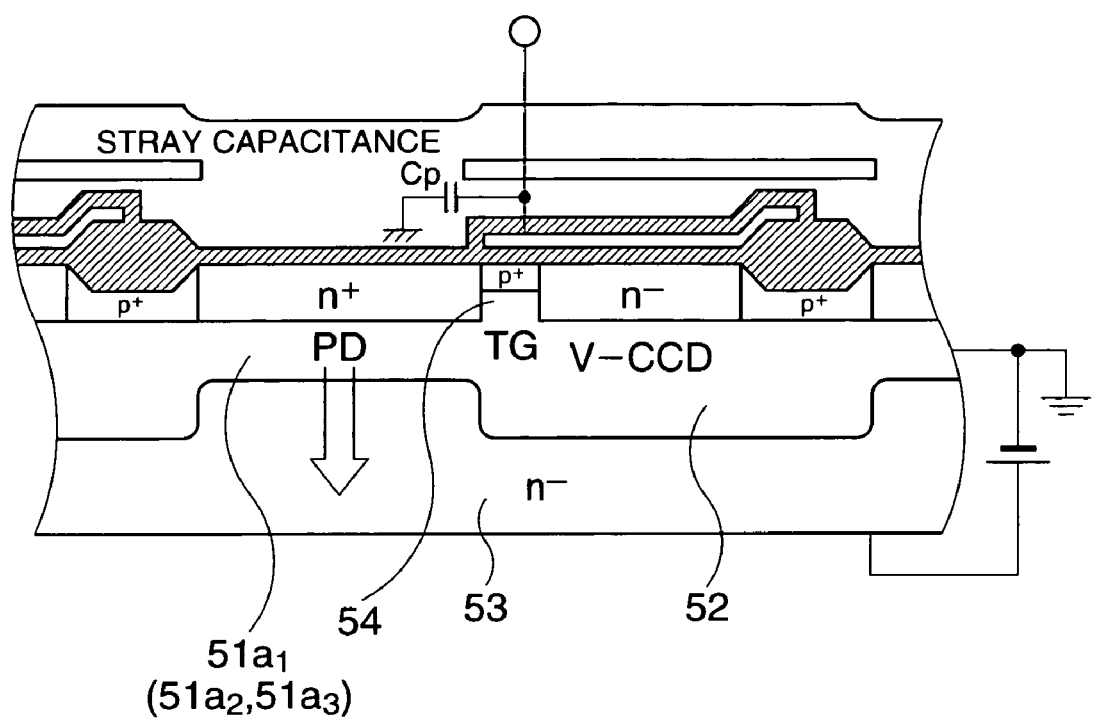
FIG. 6 is a sectioned elevational view of the CCD.

FIG. 5 is a plan view showing a disposition of the photo-diodes $51a_1$, $51a_2$ (first and second photoelectric conversion elements) and a vertical transfer unit 52, which are provided in the CCD 28. Actually, a multitude of photo-diodes $51a_1$ and $51a_2$ are arranged in a matrix, and a corresponding vertical transfer unit 52 is disposed beside each vertical column of photo-diodes $51a_1$ and $51a_2$. FIG. 6 is a sectioned elevational view of the CCD 28 in which the CCD 28 is cut by a plane perpendicular to a substrate 53. The CCD 28 is an interline CCD of vertical overflow drain (VOD) type, in which unwanted charge is discharged to the substrate 53.

The photo-diodes $51a_1$, $51a_2$ and the vertical transfer unit (electric charge holding unit) 52 are formed along a surface of the n-type substrate 53. As shown in FIG. 5, in the vertical direction of the CCD 28, the photo-diodes $51a_1$ are arranged with three photo-diodes $51a_2$ in between each of the photo-diodes $51a_1$, that is, the photo-diodes $51a_1$ are disposed every fourth horizontal line of the CCD 28. The vertical transfer unit 52 is disposed adjacent to the each of photo-diodes $51a_1$ and $51a_2$, parallel to rows extending in a vertical direction in FIG. 5 and is provided with a plurality of first and second electric charge holding units. Each of the first electric charge holding units comprises four vertical transfer electrodes $52a_1$, $52b_1$, $52c_1$ and $52d_1$, which correspond to each of the photo-diodes $51a_1$. Similarly, each of the second electric charge holding units comprises four vertical transfer electrodes $52a_2$, $52b_2$, $52c_2$ and $52d_2$, which correspond to each of the photo-diodes $51a_2$. The vertical transfer electrodes that are indicated with same reference sign are mutually connected and the electric potential of those vertical transfer electrodes are kept the same. For example, all of the vertical transfer electrodes $52a_2$ are connected together and every electrode $52a_2$ have the same electric potential. Further, the vertical transfer electrodes $52b_1$ and $52b_2$ are connected together. Similarly, groups of the vertical transfer electrodes $52c_1$, $52c_2$ and of the vertical transfer electrodes $52d_1$, $52d_2$ are also mutually connected in each group. Namely, the vertical transfer electrodes provided in the vertical transfer units 52 of CCD 28 are classified into five groups of electrodes, that is, the group comprised of the electrodes $52a_1$, the group comprised of the electrodes $52a_2$, the group comprised of the electrodes $52b_1$, $52b_2$, the group comprised of the electrodes $52c_1$, $52c_2$ and the group comprised of the electrodes $52d_1$, $52d_2$. For each group of electrode, voltage signals can be applied independently. Namely, for example, voltage signal can be applied only to the electrodes indicated with the reference sign $52a_1$ or the reference signs $52b_1$ and $52b_2$, and not to the other electrodes. Therefore, in the vertical transfer unit 52, four potential wells can be formed, so that a signal charge is output from the CCD 28 by controlling a depth of the wells, as is well known. Note that a number of the vertical transfer electrodes can be changed, depending upon the requirement of the CCD 28.

The photo-diodes (PD) $5a_1$, $51a_2$ and the vertical transfer unit (V-CCD being electric charge holding unit) 52 are disposed in a p-type well formed on a surface of the substrate 53. The p-type well is completely depleted due to an inverse bias voltage applied between the p-type well and the n-type substrate 53. In this state, electric charge is accumulated in the photo-diodes $51a_1$, $51a_2$, and an amount of the electric charge corresponds to an amount of an incident light beam, which is the reflected light beam reflected by the measurement subject. When a substrate voltage is changed to a value greater than a predetermined value, electric charge accumulated in the photo-diodes $51a_1$, $51a_2$ is discharged to the substrate 53. Conversely, when an electric charge transfer signal, which is a voltage signal, is applied to a transfer gate (TG) 54, the electric charge accumulated in the photo-diodes $51a_1$, $51a_2$ is transferred to the vertical transfer unit 52. Namely, after the electric charge is discharged to the substrate 53 by the electric charge discharging signal, the signal charge accumulated in the photo-diodes $51a_1$, $51a_2$ is transferred to the vertical transfer unit 52 by the electric charge transfer signal. By repeating the discharge and the transfer, an electronic shuttering operation is performed.

The CCD, in the present embodiment, is provided with the photo-diodes $51a_1$ comprising the vertical transfer electrodes $52a_1$ and photo-diodes $51a_2$ comprising the vertical transfer electrodes $52a_2$. However, only photo-diodes $51a_1$ are used for detecting data that relates to the distance. As described later, the reason why only photo-diodes $51a_1$ are used for sensing the data relating to the distance is due to the difficulty that occurs during the distance information sensing operation when the number of pixels (the number of photo-diodes) is increased as to obtain a high definition image. On the other hand, the image information sensing operation, which detects data relating to an image of the measuring subject, applies both the photo-diodes $51a_1$ and $51a_2$ in the operation.

Figure 7:
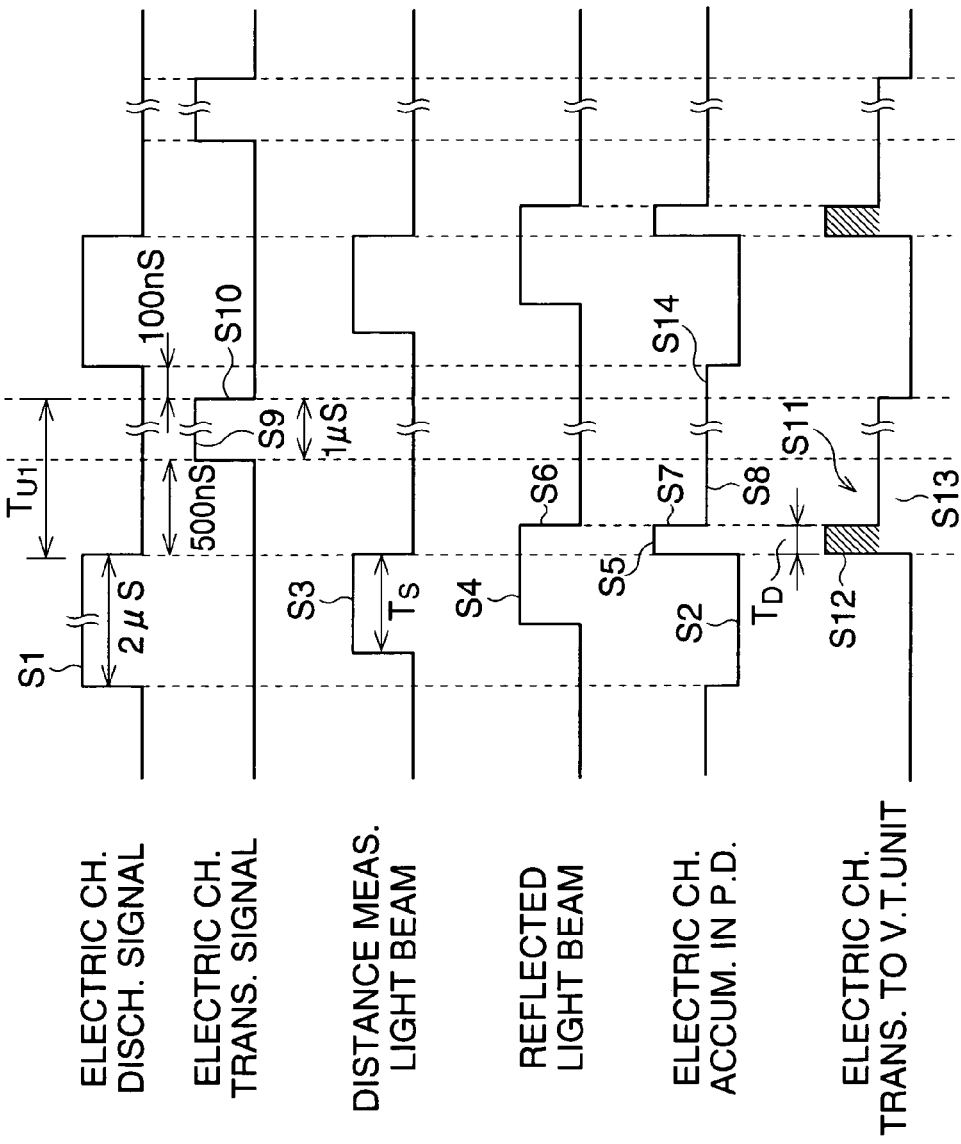
FIG. 7 is a timing chart of a distance information sensing operation by which data, corresponding to a distance from a camera body to each point on a surface of the measurement subject, is sensed.

FIG. 7 is a timing chart of a distance information sensing operation by which data, corresponding to the distance from the camera body 10 to each point on a surface of the measurement subject, is sensed. The distance information sensing operation is described below with reference to FIGS. 1, 2, 5, 6 and 7. Note that the timing chart of the distance information sensing operation in the present embodiment is slightly different from the timing chart of the distance measurement principle, which was described above with reference to FIG. 4. Namely, the timing chart of the present embodiment is set so as to sense the reflected light beam from a point subsequent to the rise of the reflected light beam pulse to a point subsequent to the fall. By this manner, a noise component due to an ambient daylight may be reduced, though the principles of the above distance measurement means are basically the same.

In synchronization with an output of a vertical synchronizing signal (not shown), an electric charge discharging signal (a pulse signal) S1 is output, so that unwanted charge, which is accumulated in the photo-diodes $51a_1$, is discharged to the substrate 53. The electric charge value, while the pulse signal S1 is output, is indicated as S2 in the chart. After the electric charge discharging signal S1 is output, the light emitting device 14 is actuated, and thus a distance measuring light beam S3, which is a pulsed beam having a constant width $T_s$, is output therefrom. A period for outputting the distance measuring light beam S3 or the width of the pulse beam is modulated according to a requirement. In the present embodiment, the distance measuring light beam S3 is modulated as to be completed approximately simultaneously with a completion of the output of the electric charge discharging signal S1.

The distance measuring light beam S3 is reflected by the measurement subject, and enters the CCD 28 as a reflected light beam S4. When the output of the electric charge discharging signal S1 ends, the electric charge for incident light, which comprises the reflected light beam S4 and an ambient daylight, starts on each of the photo-diodes and a signal charge S5 is sensed. When an incident of the reflected light beam S4 is completed, i.e. after the fall indicated with a reference sign S6, the photo-diodes only generate signal charge S8 due to the ambient daylight.

An electric charge transfer signal (pulse signal) S9 is output only to the vertical transfer electrodes $52a_1$, and an electric charge accumulated in the photo-diodes $51a_1$ are transferred to the vertical transfer unit 52. The operation of transferring the accumulated electric charge in the photo-diodes $51a_1$ ends with the fall S10, which is a termination of the output of the electric charge transfer signal S9. Namely, a signal charge S11 of which electric signal accumulation was started just after the completion of the electric charge discharging signal output and terminated just after the completion of the output of the electric transfer signal S9, is transferred to the vertical transfer unit 52, while the photo-diodes continue to accumulate electric signals S14 due to the ambient daylight.

Thus during a period $T_{U1}$ from the end of the output of the electric charge discharging signal S1 to the end of the output of the electric charge transfer signal S9, a signal charge S1, corresponding to distances from the camera body 10 to the measurement subject and the ambient daylight is accumulated in the photo-diodes $51a_1$. Namely, the signal charge S12, a hatched portion of signal charge S1, corresponds to the distances from the camera body 10 to the measurement subject, while a residual portion S13 of the signal charge S11 results from the ambient daylight.

When a predetermined time has elapsed since the output of the electric charge transfer signal S9, a subsequent electric charge discharge signal is output, so that the signal charge S14, an electric charge accumulated in the photo-diodes after the signal charge transfer to the vertical transfer unit 52, is discharged to the substrate 53. Subsequently, another signal charge is accumulated in the photo-diodes $51a_1$. Then, similarly to the above description, when the electric charge accumulation period $T_{U1}$ has again elapsed, the signal charge S11 is transferred to the vertical transfer unit 52.

The transferring operation of the signal charge S11 to the vertical transfer unit 52 is repeatedly performed until the next vertical synchronizing signal (not shown) is output. Thus, the signal charge S11 is integrated in the vertical transfer unit 52. The signal charge S11 integrated for one field period, which is between two vertical synchronizing signals, corresponds to distance information of the measurement subject, on condition that the measurement subject is stationary for the period between the two vertical synchronizing signals.

The detecting operation of the signal charge S11 described above is carried out in all of the photo-diodes $51a_1$ provided in the CCD 28. As a result of the detecting operation for one field period, the distance information sensed by the photo-diodes $51a_1$ is held in each corresponding vertical transfer unit $52a_1$, which is located adjacent to each column of photo-diodes $51a_1$. The distance information is output from the CCD 28 by a vertical transferring operation of the vertical transfer units 52 and a horizontal transferring operation of a horizontal transfer unit (not shown). The distance information is then output from the CCD 28, as a three-dimensional image data of the measured subject.

The reflected light beam detected by the CCD 28 is affected by the reflectance of the surface of the subject. Therefore, the distance information obtained through the reflected light beam contains error derived from the reflectance. Further, the light beam sensed by the CCD 28 may contain an extra component, such as ambient daylight, being other than the reflected light beam from the measurement subject, which can cause an error.

Figure 8:
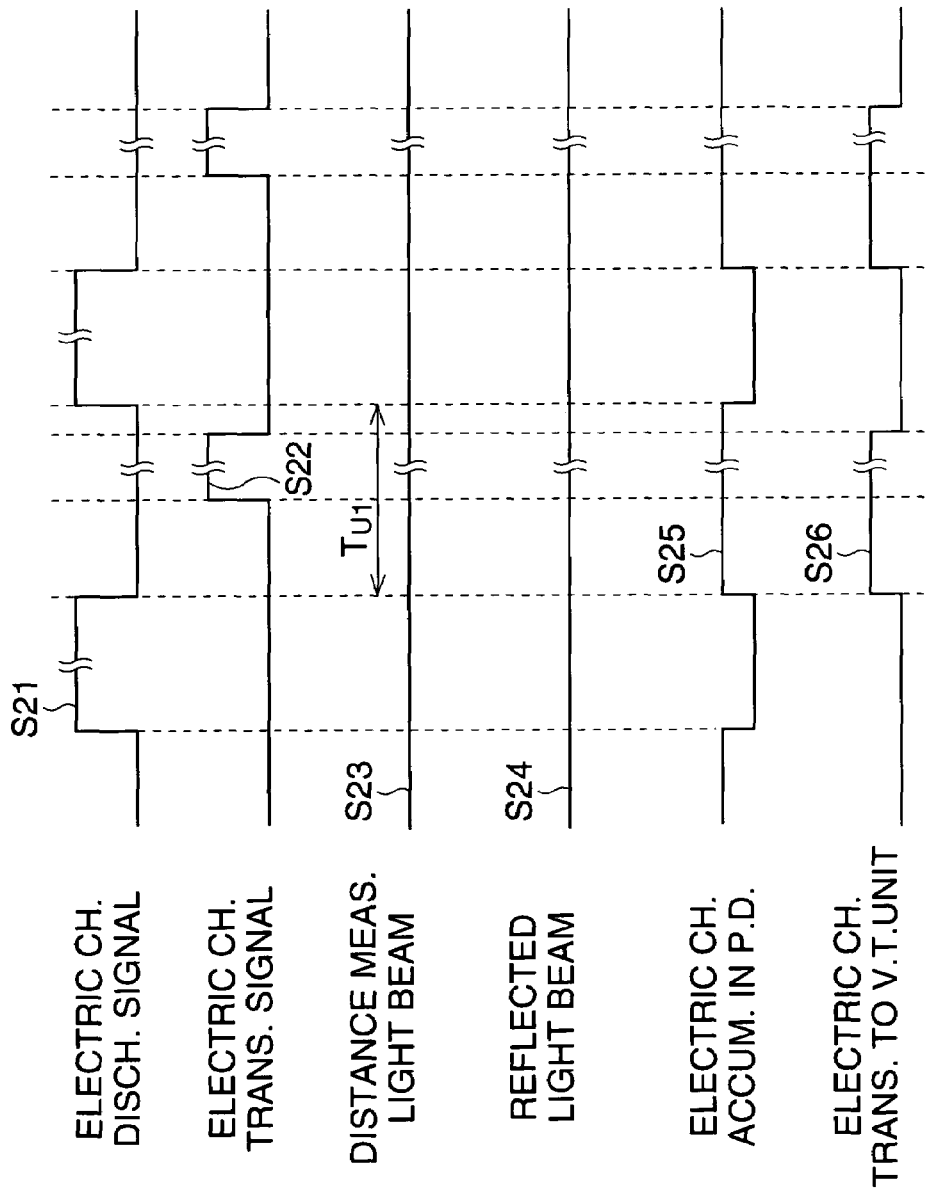
FIG. 8 is a timing chart of a distance correction information sensing operation.
Figure 9:
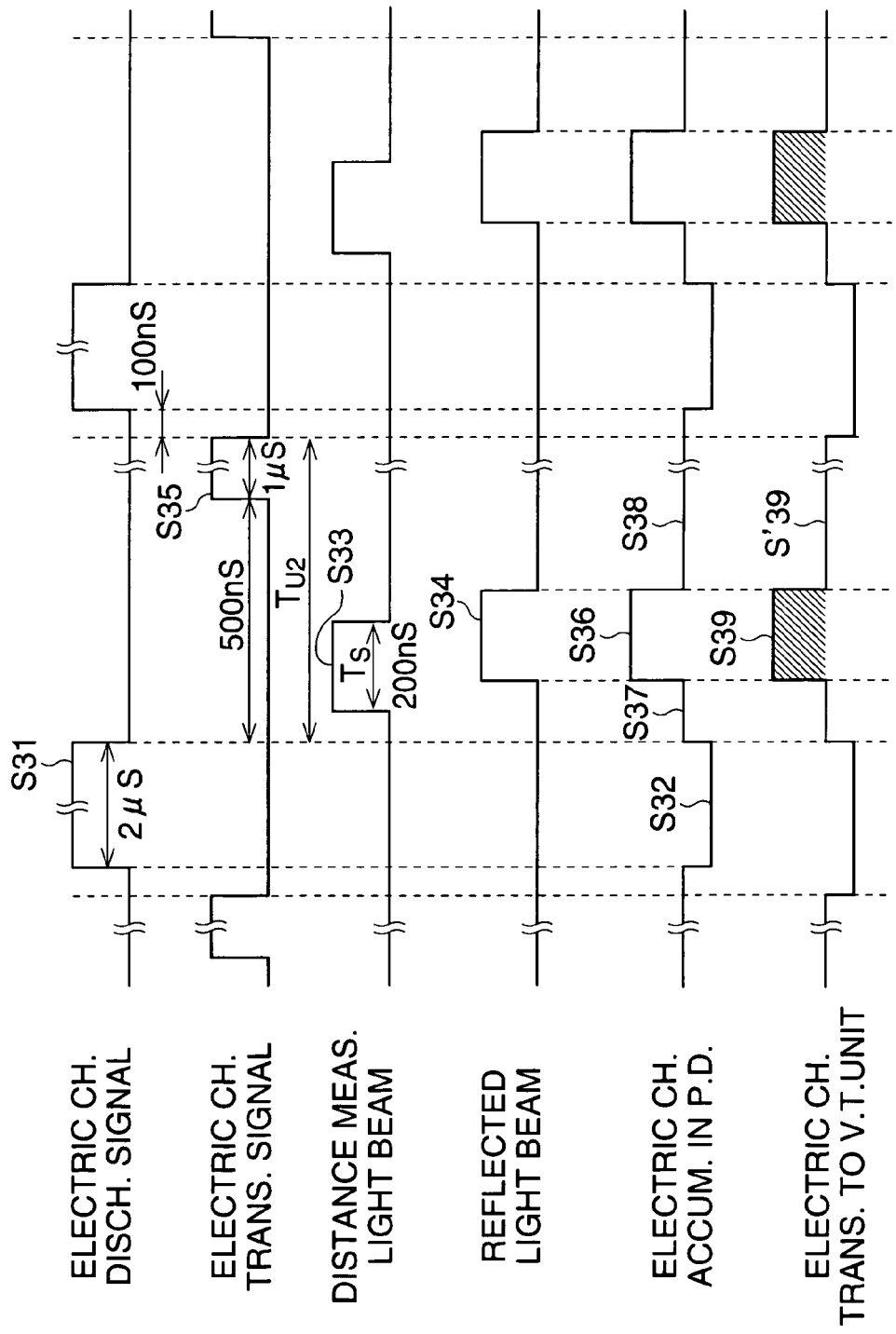
FIG. 9 is a timing chart of a reflectance information sensing operation.
Figure 11A:
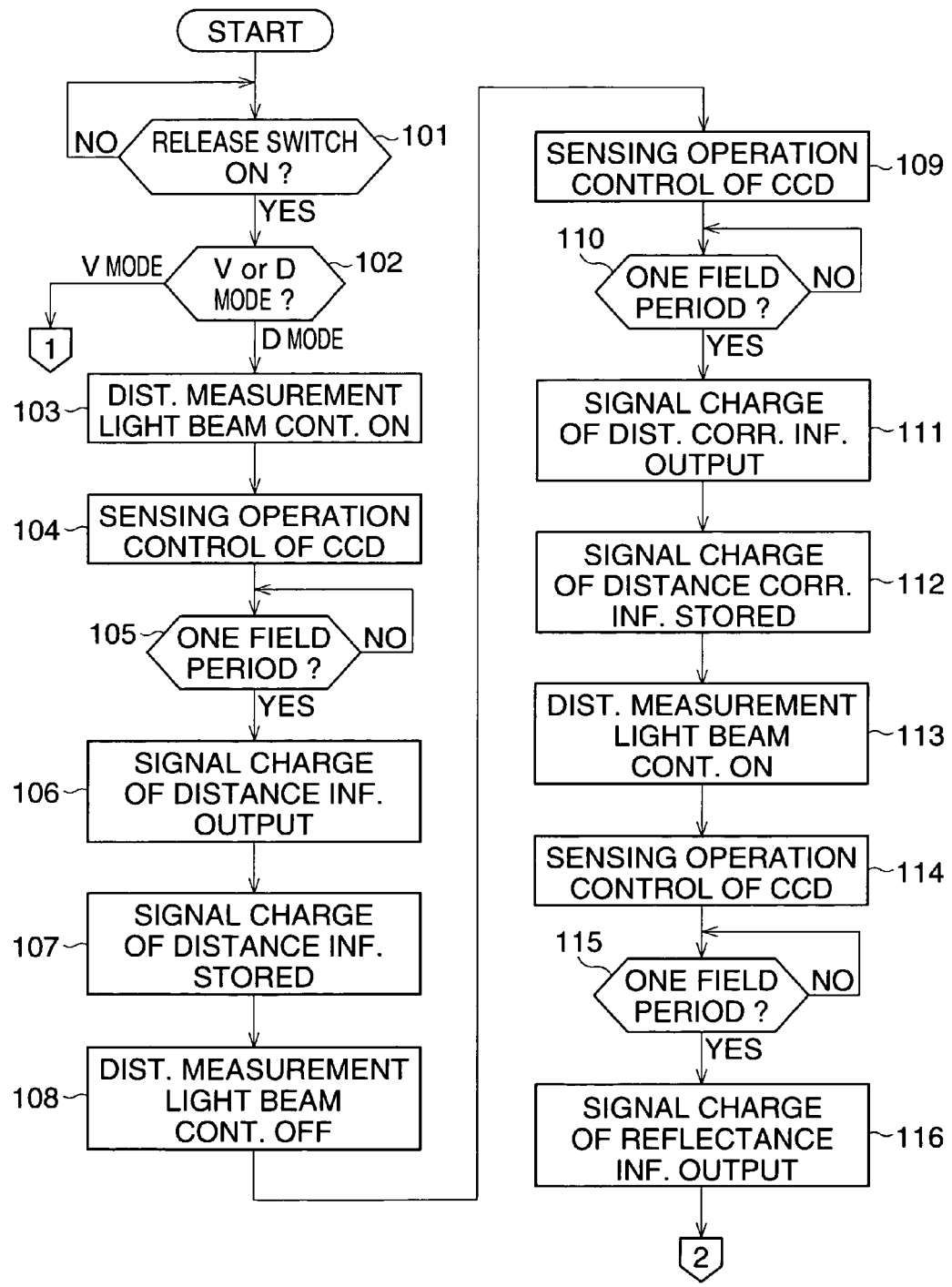
FIGS. 11A and 11B show a flowchart of the distance information sensing operation of the first embodiment.
Figure 11B:
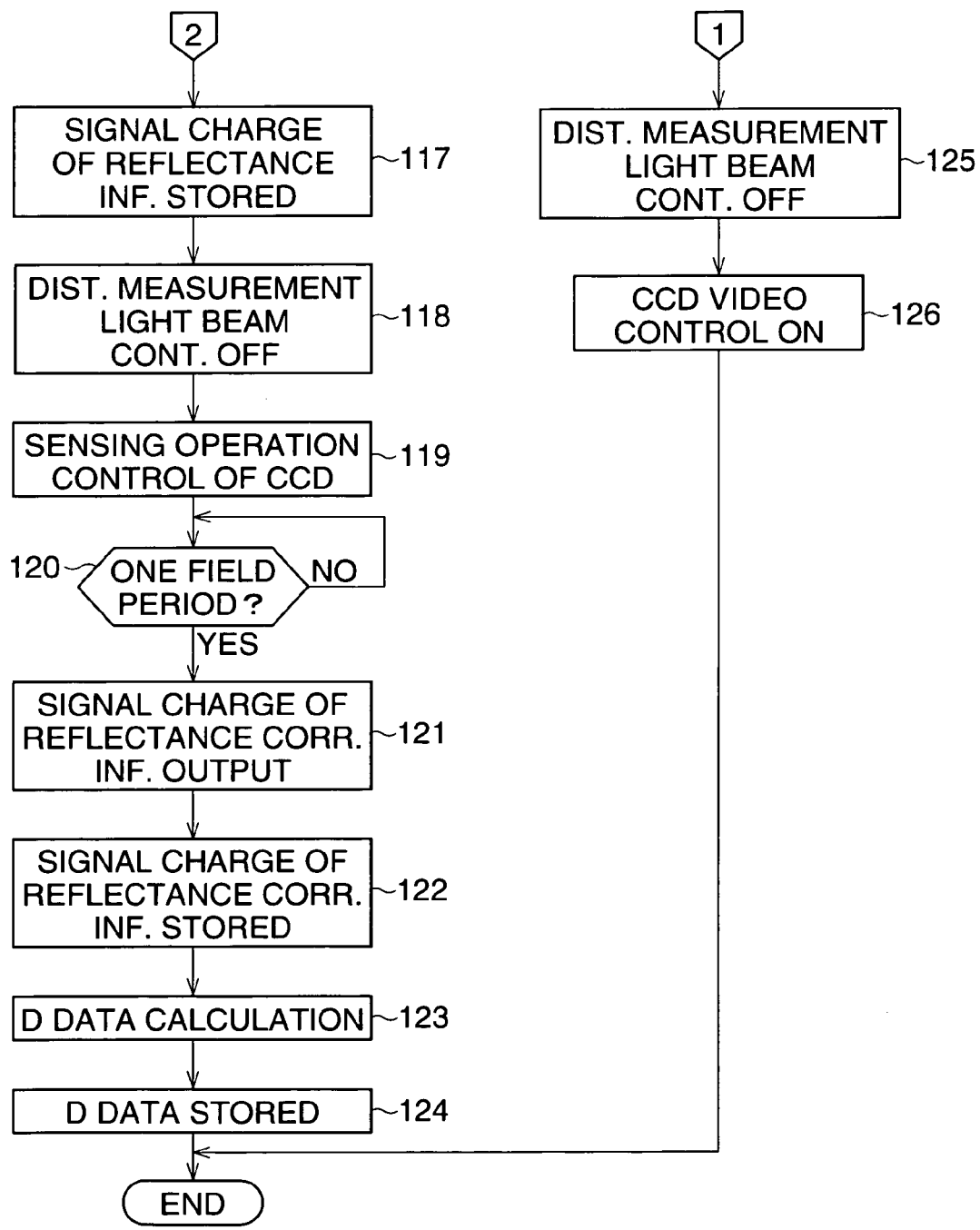

With reference to FIG. 1, FIG. 2, FIG. 7 to FIG. 11B, methods of correcting such errors are explained as a part of the distance information sensing operation, performed in the present embodiment. FIG. 8, FIG. 9 and FIG. 10 are timing charts of a distance correction information sensing operation, a reflectance information sensing operation and a reflectance correction information sensing operation, respectively. FIG. 11A and FIG. 11B are a flowchart of the distance information sensing operation.

When it is recognized in Step 101 that the release switch is fully depressed, Step 102 is executed in which it is determined which mode is selected, a video (V) mode or a distance measurement (D) mode. A change between the modes is carried out by manually operating the V/D mode switch 18.

When the D mode is selected, Step 103 is executed in which the vertical synchronizing signal is output and a distance measuring light beam control is started. Namely, the light emitting device 14 is driven so that the distance measuring light beam S3 is intermittently output as a pulsed beam. Then, Step 104 is executed so that a sensing operation control of the CCD 28 is started. Namely, the distance information sensing operation described with reference to FIG. 7 is started, and thus the electric charge discharging signal S1 and the electric charge transfer signal S9 are alternately output, so that the signal charge S11 of the distance information is integrated in the vertical transfer unit 52.

In Step 105, it is determined whether one field period has elapsed since the beginning of the distance information sensing operation, i.e., whether a new vertical synchronizing signal has been output. When one field period has passed, the process goes to Step 106 in which the signal charge S11 of the distance information is output from the CCD 28. The signal charge S11 is then temporally stored in the image memory 34 in Step 107. Then, in Step 108, the distance measuring light beam control is turned OFF, and thus the light emitting operation of the light emitting device 14 is terminated.

In Steps 109 through 112, the distance correction information sensing operation is performed. In Step 109, a vertical synchronizing signal is output, and a sensing operation control of the CCD 28 is started. Namely, as shown in FIG. 8, an electric charge discharging signal S21 and an electric charge transfer signal S22 are alternately output while the light emitting operation of the light emitting device 14 is not carried out, i.e., while the light source is not illuminated. Although the electric charge accumulation period $T_{U1}$ is the same as that of the distance information sensing operation shown in FIG. 7, the distance measuring light beam does not irradiate the measurement subject (reference S23), and thus there is no reflected light beam (reference S24). Therefore, although a signal charge of the distance information is not generated, a signal charge S25 corresponding to an interference or noise component is generated, since the noise component, such as ambient daylight, enters the CCD 28. When an electric charge transfer signal S22 is output, a signal charge S26, a charge accumulated during the electric charge accumulation period $T_{u1}$, is transferred to the vertical transfer unit 52. The signal charge S26 corresponds to distance correction information, which is used for correcting an error generated in the distance information due to the noise component, and is related to the electric charge accumulation period $T_{U1}$.

In Step 110, it is determined whether one field period has elapsed since the beginning of the distance correction information sensing operation, i.e., whether a new vertical synchronizing signal has been output. When one field period has passed, the process goes to Step 111 in which the signal charge S26 of the distance correction information is output from the CCD 28. The signal charge S26 is then temporarily stored in the image memory 34 in Step 112.

In Steps 113 through 117, the reflectance information sensing operation is performed. In Step 113, a vertical synchronizing signal is output, and a distance measuring light beam control of the CCD 28 is started. Namely, as shown in FIG. 9, a distance measuring light beam S33 is intermittently output as a pulsed beam. In Step 114, a sensing operation control of the CCD 28 is started, and thus an electric charge discharging signal S31 and an electric charge transfer signal S35 are alternately output. The electric charge of photo-diodes is discharged (reference S32) as the electric charge discharge signal S31 is output. After completion of an output of the electric charge discharge signal S31, a distance measurement light beam S33 is emitted from the light emitting device 14, and a reflected light beam S34 is made incident on the CCD 28. An electric charge transfer signal S35 is output after a period sufficient to detect all of the reflected light beam S34. Namely, the reflectance information sensing operation is controlled in such a manner that all of the reflected light beam S34 is received within an electric charge accumulation period $T_{U2}$, which is from an end of an output of the electric charge discharging signal S31 to an end of an output of the electric charge transfer signal S35. Note that, a width $T_S$ of the signal charge S33 accumulated in each of the photo-diodes 51$a_1$ of the CCD 28 is the same as a width $T_S$ of the distance measuring light beam S33.

During a period in which all of the reflected light beam S34 is sensed, a signal charge S36 accumulated in the photo-diodes 51$a_1$ is due to the reflected light beam S34 and the ambient daylight. The signal charges S37 and S38 are charges generated only by the ambient daylight. When the electric charge transfer signal S35 is output, the signal charge S39 is transferred to the vertical transfer unit 52.

Therefore, the signal charge, which is detected during the electric charge accumulation period $T_{U2}$, including the signal charge S' 39 generated by the ambient daylight, does not depend upon the distance of the measurement subject, and corresponds to the reflectance information which depends on the reflectance of the surface of the measurement subject.

In Step 115, it is determined whether one field period has elapsed since the beginning of the reflectance information sensing operation, i.e., whether a new vertical synchronizing signal has been output. When one field period has passed, the process goes to Step 116 in which the signal charge S39 of the reflectance information is output from the CCD 28. The signal charge S39 is then temporarily stored in the image memory 34 in Step 117. Then, in Step 118, the distance measuring light beam control is turned OFF, and thus the light emitting operation of the light emitting device 14 is terminated.

In Steps 119 through 122, the reflectance correction information sensing operation is performed. In Step 119, a vertical synchronizing signal is output, and a sensing operation control of the CCD 28 is started. Namely, as shown in FIG. 10, an electric charge discharging signal S41 and an electric charge transfer signal S42 are alternately output while the light emitting operation of the light emitting device 14 is not carried out. Although the electric charge accumulation period $T_{U2}$ is the same as that of the reflectance information sensing operation shown in FIG. 9, the distance measuring light beam does not irradiate the measurement subject (reference S43), and thus there is no reflected light beam (reference S44). Therefore, although a signal charge of the reflectance information is not generated, a signal charge S46 corresponding to an interference component or a noise component is generated, since the noise component, such as ambient daylight, enters the CCD 28. A signal charge S47 is a charge accumulated during the electric charge accumulation period $T_{u2}$ and is transferred to the vertical transfer unit 52 by the electric charge transfer signal S42. The signal charge S47 corresponds only to reflectance correction information, which is used for correcting an error generated in the reflectance information due to the noise component, and is related to the electric charge accumulation period $T_{U2}$.

In Step 120, it is determined whether one field period has elapsed since the beginning of the reflectance correction information sensing operation, i.e., whether a new vertical synchronizing signal has been output. When one field period has passed, the process goes to Step 121 in which the signal charge S46 of the reflectance correction information is output from the CCD 28. The signal charge S47 is temporarily stored in the image memory 34 in Step 122.

In Step 123, a calculation process of the distance measurement (D) data is performed using the distance information, the distance correction information, the reflectance information and the reflectance correction information, which are obtained in Steps 103 through 122. The D data is output in Step 124, and the sensing operation ends. Conversely, when it is determined in Step 102 that the V mode is selected, the distance measuring light beam control is turned OFF in Step 125, and a normal photographing operation (i.e., CCD video control) using all photo-diodes 51$a_1$, 51$a_2$ of the CCD 28 is turned ON. Then, the sensing operation ends.

With reference to FIGS. 7 through 10, the contents of the calculation executed in Step 123 is described below.

It is supposed that the measurement subject of reflectance R is illuminated and an image of the measurement subject is formed on the CCD 28 while considering that the measurement subject to be a two-dimensional light source. At this time, an output Sn, which is obtained by integrating an electric charge generated in a photo-diode for an electric charge accumulation period "t", is indicated as follows:

$$Sn = k \cdot R \cdot I \cdot t \quad (2)$$

wherein "k" is a proportional coefficient, which is varied in accordance with an F-number and a magnification of the photographing lens.

When the measurement subject is illuminated by light output from a light source, such as an infrared laser source, the luminance I is obtained by combining a luminance $I_S$, due to the light source and a luminance $I_B$ due to the ambient light, which is indicated as follows:

$$I = I_S + I_B \quad (3)$$

As shown in FIG. 7, it is supposed that the electric charge accumulation period is $T_{U1}$, the pulse width of the distance measuring light beam S3 is $T_S$, a pulse width of the signal charge S5 or S12 of the distance information is $T_D$, and the electric charge accumulation period is repeated N times for one field period. An output $SM_{10}$ of the CCD is:

$$SM_{10} = \Sigma(k \cdot R(I_S \cdot T_D + I_B \cdot T_{U1})) = k \cdot N \cdot R(I_S \cdot T_D + I_B \cdot T_{U1}) \quad (4)$$

wherein the pulse width $T_D$ is indicated as follows:

$$T_D = \delta \cdot t \qquad (5)$$
$$= 2r/C$$

As shown in FIG. 9, when the electric charge accumulation period $T_{U2}$ is greater than the pulse width $T_S$, such that the electric charge accumulation period $T_{U2}$ is large enough to receive the whole of the reflected light beam, an output $SM_{20}$ of the CCD is:

$$SM_{20} = \Sigma(k \cdot R(I_S \cdot T_S + I_B \cdot T_{U2})) = k \cdot N \cdot R(I_S \cdot T_S + I_B \cdot T_{U2}) \qquad (6)$$

As shown in FIG. 8, when the light beam is turned OFF to carry out a pulse-shaped electric charge accumulation, having a same width as that of FIG. 7, an output $SM_{11}$ of the CCD is:

$$SM_{11} = \Sigma(k \cdot R \cdot I_B \cdot T_{U1}) = k \cdot N \cdot R \cdot I_B \cdot T_{U1} \qquad (7)$$

Similarly, an output $S_{11}$ of the CCD, which is obtained when an electric charge accumulation shown in FIG. 10 is performed, is $$SM_{21} = \Sigma(k \cdot R \cdot I_B \cdot T_{U2}) = k \cdot N \cdot R \cdot I_B \cdot T_{U2} \qquad (8)$$

Based on the formulas (4), (6), (7) and (8), a following formula is obtained:

$$S_D = (SM_{10} - SM_{11})/(SM_{20} - SM_{21}) = T_D/T_S \qquad (9)$$

As described above, the distance measuring light beam S3 and the reflected light beam S4 contain noise, such as ambient daylight (i.e., a luminance $I_B$ due to ambient daylight). $T_D/T_S$ included in the formula (9) indicates that an amount of the reflected light beam S4 from the measurement subject, when the distance measuring light beam S3 is radiated, is normalized by an amount of the distance measuring light beam S3, and is equal to a ratio of a value in which the noise component ($SM_{11}$) (corresponding to the electric charge S26 shown in FIG. 8) is subtracted from the amount of the distance measuring light beam S3 ($SM_{10}$) (corresponding to the signal charge S11 shown in FIG. 7), to a value in which the noise component ($SM_{21}$) (corresponding to the electric charge S47 shown in FIG. 10) is subtracted from an amount of the reflected light beam S4 ($SM_{20}$) (corresponding to the signal charge S39 shown in FIG. 9).

$SM_{10}$, $SM_{11}$, $SM_{20}$ and $SM_{21}$ included in the formula (9) are stored as the distance information, the distance correction information, the reflectance information and the reflectance correction information, in Steps 107, 112, 117 and 122, respectively. Therefore, based on the information, $T_D/T_S$ is obtained. Since the pulse width $T_S$ is known, the distance r is obtained from formula (5) and $T_D/T_S$.

Thus, based on the formulas (5) and (9), the distances r from the camera body to each point on the surface of the measurement subject is corrected, so that an accuracy of a distance sensing is improved.

With reference to FIG. 6 and FIG. 12 through FIG. 14, a problem that occurs when a CCD for sensing a high definition image, in which the number of pixels exceeds a mega pixel, is used for a distance information sensing operation is explained in the following.

Figure 12:
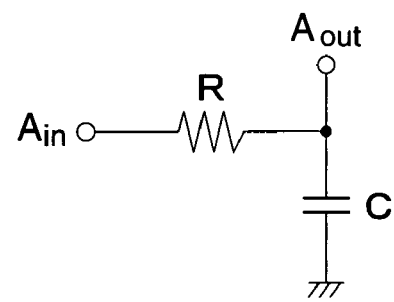
FIG. 12 is a diagram of an equivalent circuit of the vertical transfer electrodes in the CCD.

Each of the vertical transfer electrodes in the CCD circuit has a stray capacitance $C_P$, respectively. The stray capacitance $C_p$ is schematically shown in FIG. 6. A total stray capacitance for a group of the vertical transfer electrodes that are indicated with a same reference number is the result of a sum of the each stray capacitance $C_P$ of the electrodes in the group. FIG. 12 is a diagram of equivalent circuit for a group of electrodes indicated with a same reference number. C is the total stray capacitance of the electrodes of which reference numbers are identical and R is a total resistance of the same. $A_{in}$ and $A_{out}$ are input and output signals of the equivalent circuit.

Figure 13:
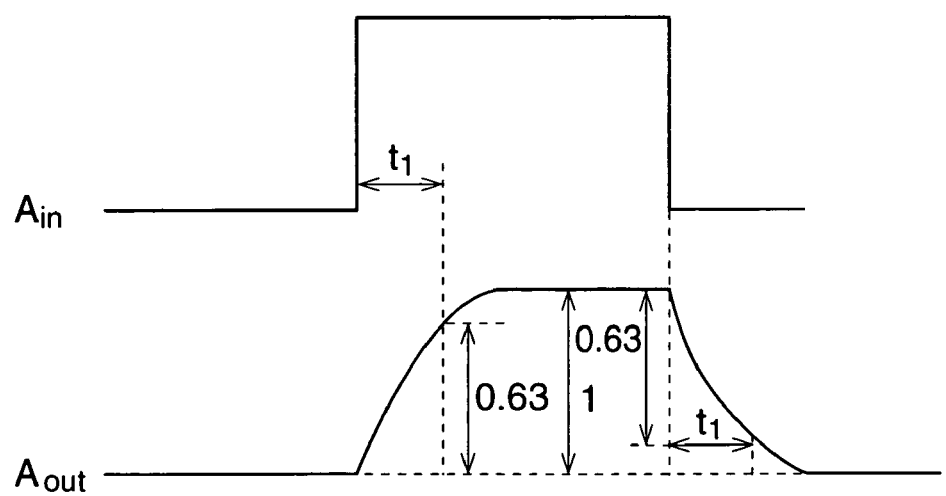
FIG. 13 shows a pulse signal input to the equivalent circuit shown in FIG. 12 and a signal output therefrom.

In FIG. 13, an input signal $A_{in}$ of rectangular pulse, which is input to the equivalent circuit, and an output signal $A_{out}$, which is output from the equivalent circuit in response to the input signal $A_{in}$, are shown. Each of the signals shown in the figure is regularized by the maximum value of each. When the input signal $A_{in}$ of the rectangular pulse is input to the CCD circuit, the rise and fall of the output signal $A_{out}$, which emerge as an applied voltage to the vertical transfer electrodes, is deformed by the total stray capacitance C and the total resistance R of the circuit. The deformation of the output pulse or output signal $A_{out}$ is characterized by a time constant $t_1 (=CR)$ of the circuit. If the number of pixels (photo-diodes) in the CCD is increased to obtain a high definition image, the number of vertical transfer electrodes inevitably increases, thus an amount of the total stray capacitance C (sum of $C_P$) increases. Consequently, the time constant $t_1$ is increased and the rise time and the fall time of the output signal $A_{out}$ are extended.

Figure 14:
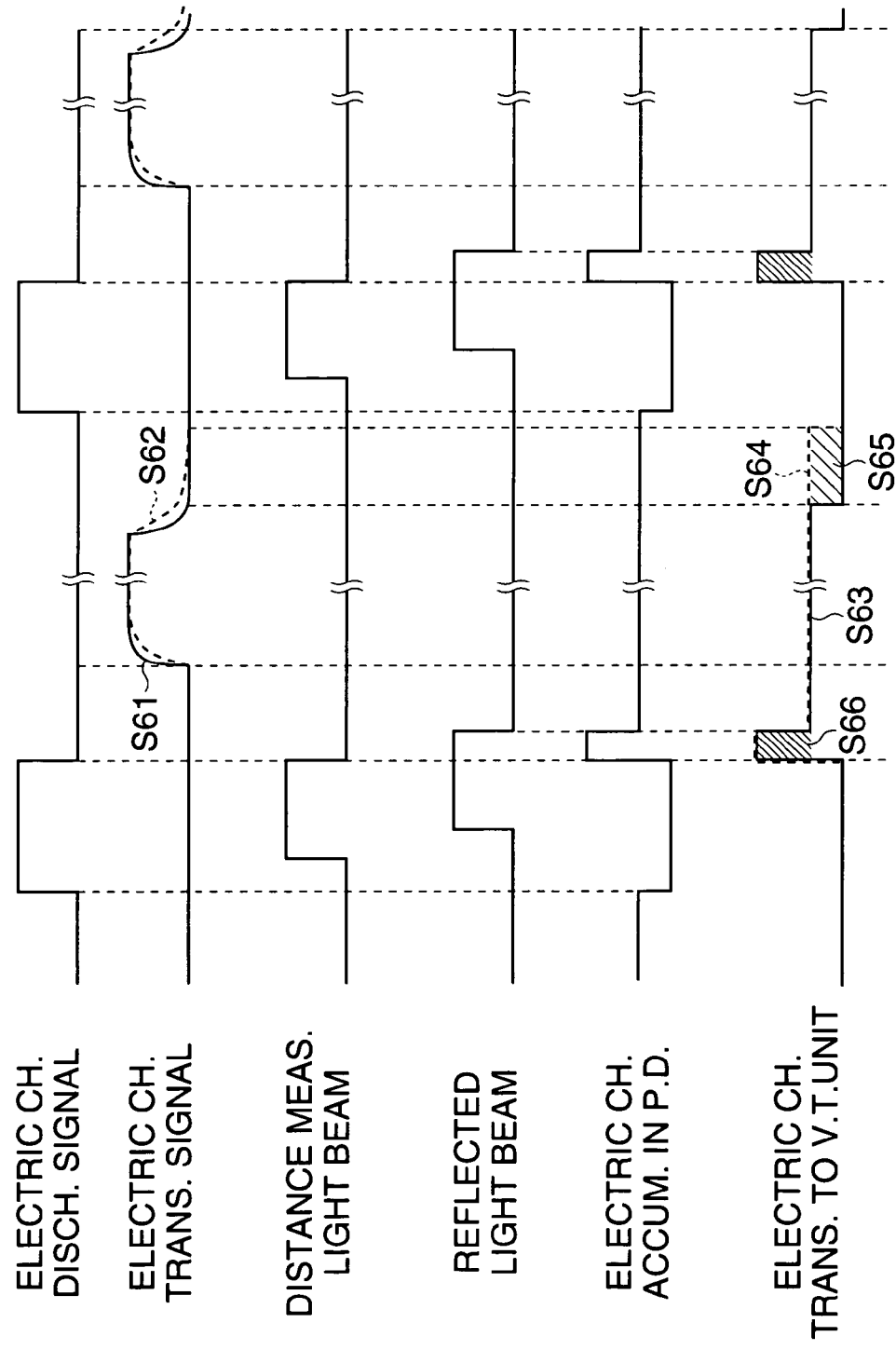
FIG. 14 is a timing chart of a distance information sensing operation regarding the time constant in the equivalent circuit of the vertical transfer electrodes.

For example, when all of the photo-diodes $51a_1$, $51a_2$ in the CCD are used in the distance information sensing operation under the condition in which the amount of the total stray capacitance C and resistance R for the circuit that comprises all the vertical transfer electrodes $52a_1$, $52a_2$ of the CCD, are respectively 3 nF (3,000 pF) and 50 Ω, the time constant $t_1$ of the circuit becomes 150 ns. However, when only the photo-diodes $51a_1$ are used in the distance information sensing operation, amounts of the total stray capacitance C and resistance R are respectively reduced to 750 pF and 70 Ω, since the photo-diodes $51a_1$, as shown in FIG. 5, are provided on every fourth line of the CCD and the number of the horizontal lines used in the distance information sensing operation is thinned out to one fourth of the entire horizontal lines of the CCD, that is, the one fourth of the entire electrodes $52a_1$, and $52a_2$ are used. Consequently, the time constant $t_1$ is reduced to 52.5 ns. FIG. 14, as well as FIG. 7, is a timing chart of the distance information sensing operation. However, FIG. 14 shows timing of the electric charge transfer signal when the time constant $t_1$ is 150 ns and 52.5 ns. The electric charge transfer signal S61, shown in a solid line, corresponds to the case in which the photo-diodes $51a_1$ are only used in the distance information sensing operation and the time constant $t_1$ is 52.5 ns. On the other hand, the electric charge transfer signal S62, shown in a broken line, is an electric charge transfer signal when the entire photo-diodes $51a_1$, $51a_2$ are used and the time constant $t_1$ is 150 ns. Furthermore, the signal charge S63 shown in a solid line and the signal charge S64 shown in a broken line, which are transferred to the vertical transfer unit 52, correspond to the electric charge transfer signal S61 and S62, respectively.

In the present embodiment, a transmission of a signal charge to the vertical transfer unit 52 from the photo-diodes $51a_1$ or $51a_2$ begins with the rise of the electric charge transfer signal and ends with the fall of the same. The fall of the electric charge transfer signal S61 declines more rapidly than that of the electric charge transfer signal S62. Therefore less of the signal charge due to the ambient daylight is transferred to the vertical transfer unit 52 when the transmission is executed by the electric transfer signal S61 instead of the electric transfer signal S62. A decrease in the amount of signal charge due to the ambient daylight is indicated with a hatched portion S65. Consequently, as for the signal charge transferred to the vertical transfer unit 52, a signal charge component S66, which corresponds to the distance information, relatively increases while the signal charge component corresponding to the ambient daylight or noise decreases. Thus the noise component included in the distance information decreases and the accuracy of the distance information sensing operation improves. Further, as the time for transporting the signal charge from the photo-diodes to the vertical transfer unit decreases, the number of times for integrating the signal charge during one field period can be increased as to obtain a higher level of the signal output.

As described above, according to the first embodiment, even though a high definition CCD is used, an optical shutter need not be provided since an output sufficient to acquire distance information to the measurement subject is obtainable, thus the three-dimensional image capturing apparatus can be miniaturized and manufactured at a low cost.

Further, according to the first embodiment, the distance information, which is three-dimensional image data regarding the topography of the measurement subject, is detected and accumulated concurrently without a need for scanning the distance measuring light beam over the measurement subject. Accordingly, a time over which the three-dimensional image of the measurement subject is obtained can be drastically shortened.

Note that, in the first embodiment, an influence derived from noise, such as ambient daylight, is removed from the distance information of the measurement subject. Nevertheless, in a case where the influence can be neglected, the values of the signal charge regarding the influence (i.e., $S_{11}$ and $S_{21}$) can be omitted from formula (9). Thus, a correction regarding only the reflectance of the surface of the measurement subject is carried out.

Further, in the first embodiment, although the accumulation of signal charge is performed for one field period in Steps 105, 110, 115 and 120, respectively, the accumulation may be carried out for a plurality of field periods.

Furthermore, in the first embodiment, the photo-diodes $51a_1$, which are used for detecting the distance information, are arranged at intervals of every fourth horizontal line with three horizontal lines of photo-diodes $51a_2$ in between, however, the photo-diodes $51a_1$ can also be arranged in the horizontal lines of the CCD at intervals with a predetermined number of horizontal lines of photo-diodes $51a_2$ in between. Further, a combination of the above arrangements may be applied.

With reference to FIG. 15 through FIG. 22, a second embodiment is described in the following. Note that a mechanical construction and an electrical construction are similar to those of the first embodiment, so only constructions that are different from those of the first embodiment are explained.

Figure 15:
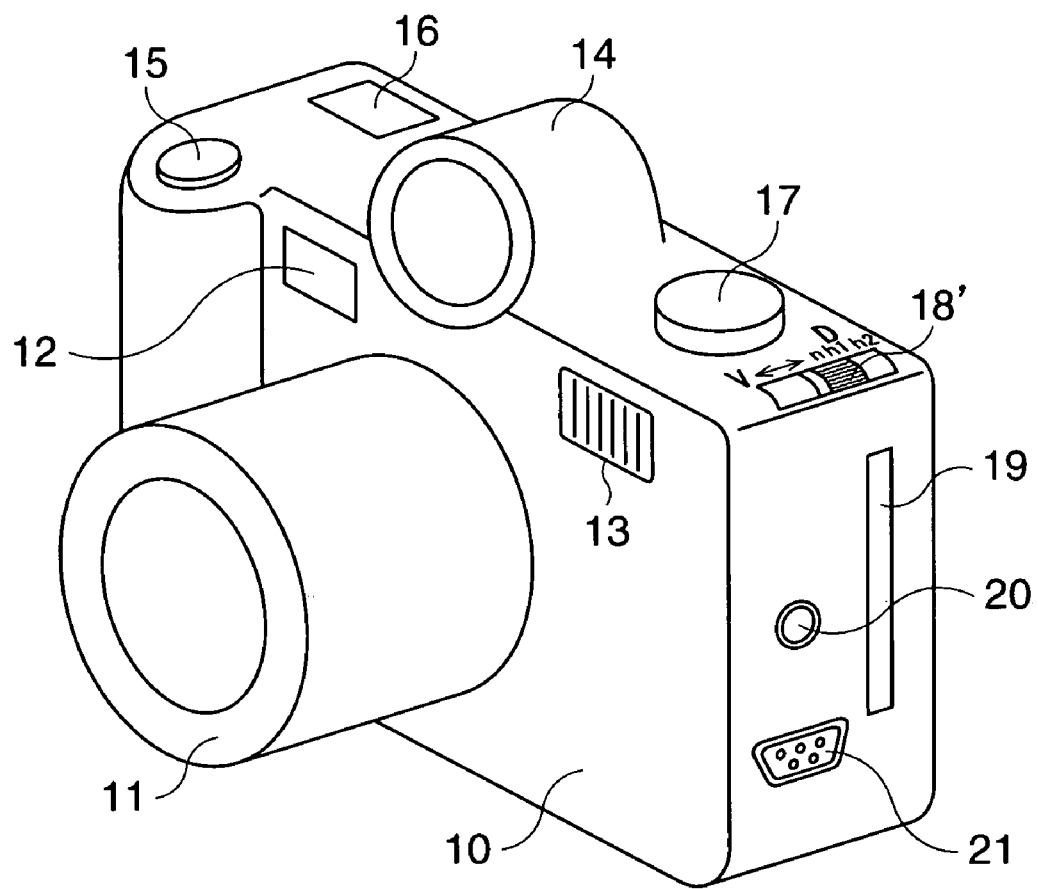
FIG. 15 is a perspective view showing a camera provided with a three-dimensional image capturing device of a second embodiment of the present invention.

FIG. 15 is a perspective view of a camera type three-dimensional image capturing device of the second embodiment of the present invention.

In the second embodiment, the distance-measurement (D) mode is further separated into normal mode (Dn mode: first distance information sensing means), a first high-speed mode (Dh1 mode: second distance information sensing means) and a second high-speed mode (Dh2 mode: third distance information sensing means). As a result, V/D mode switch 18' has four selective positions corresponding to each of the above three modes and V mode. The details of the Dn mode, Dh1 mode and Dh2 mode are given later.

Figure 16:
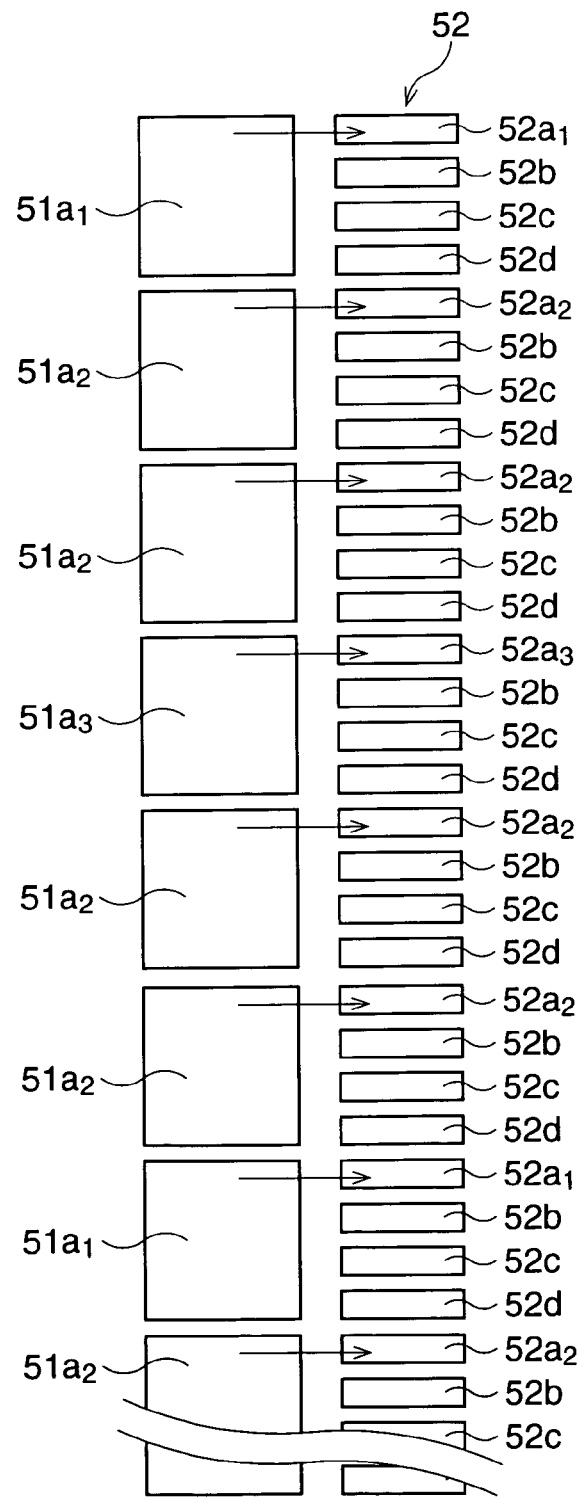
FIG. 16 is a plan view showing a disposition of photodiodes and a vertical transfer unit, which are provided in the CCD of the second embodiment.

In the second embodiment, the CCD 28, for example, is composed of photo-diodes $51a_1$, $51a_2$ and $51a_3$, which are electrically separated into three groups. FIG. 16 shows a plan view of a disposition of the photo-diodes $51a_1$, $51a_2$, $51a_3$ and the vertical transfer unit 52, which are provided in the CCD 28.

Similar to the first embodiment, the photo-diodes $51a_1$, $51a_2$, $51a_3$ and the vertical transfer unit 52 are disposed along a surface of the n-type substrate 53 (refer FIG. 6). The photo-diodes $51a_1$, $51a_2$ and $51a_3$ are arranged in a matrix, although in the figure only one vertical line or column of the photo-diodes is shown. The photo-diodes are downwardly arranged in an order of $51a_1$, $51a_2$, $51a_2$, $51a_3$, $51a_2$, $51a_2$ and they are repeatedly arranged in this order.

The vertical transfer unit 52 is disposed beside each vertical column of photo-diodes. The vertical transfer unit 52 has four vertical transfer electrodes for each photo-diode. Namely, the vertical transfer unit 52 beside the photo-diodes $51a_1$ has vertical transfer electrodes $52a_1$, 52b, 52c and 52d. Similarly, the vertical transfer unit 52 beside the photo-diodes $51a_2$ and $51a_3$ has vertical transfer electrodes $52a_2$, 52b, 52c, 52d and vertical transfer electrodes $52a_3$, 52b, 52c, 52d, respectively. Vertical transfer electrodes indicated with the same reference number are electrically connected together in the circuit and a voltage signal can be independently applied to each group of electrodes that are indicated with the same reference number. Signal charges accumulated in a photo-diode are integrated in the vertical transfer unit 52 by the same method described in the first embodiment and an electronic shuttering operation is performed.

In the second embodiment, the photo-diodes of the CCD are separated into three groups of the photo-diodes $51a_1$, $51a_2$ and $51a_3$. This separation is for sensing three-dimensional distance information of a moving subject. When a subject is moving, a detecting period for sensing distance information needs to be shortened. As described latter, this shortening is achieved by using 1/N (e.g. N=1,2,3) horizontal lines of photo-diodes of the CCD in the sensing operation of distance information. In the second embodiment, as mentioned above, D mode has three selective modes, which are Dn mode, Dh1 mode and Dh2 mode. Dn mode is a mode that detects distance information of the measurement subject when the subject can be regarded as stationary during the period of sensing the distance information, and it uses all three groups of the photo-diodes, $51a_1$, $51a_2$ and $51a_3$, for detecting the distance information. Namely, all horizontal lines comprising photo-diodes $51a_1$, $51a_2$ or $51a_3$ are effective horizontal lines. Dh1 mode and Dh2 mode are modes to detect distance information of the subject when the subject is moving. Dh1 mode uses two groups of the photo-diodes, $51a_1$ and $51a_3$, for sensing the distance information and Dh2 mode uses one group of the photo-diodes, $51a_1$, for the same. Namely, in Dh1 mode, horizontal lines comprising photo-diodes $51a_1$ or $51a_3$ are effective horizontal lines, and in Dh2 mode, horizontal lines comprising photo-diodes $51a_1$ are the effective horizontal lines. Dh2 mode is for sensing the distance information of a fast moving subject while Dh1 mode is for a relatively slower moving subject. Namely, each of Dn mode, Dh1 mode and Dh2 mode corresponds to distance information sensing operations which are carried out with the photo-diodes of the CCD thinned out to ½, ⅓ and ⅙ of the horizontal lines in the CCD, respectively.

Figure 17A:
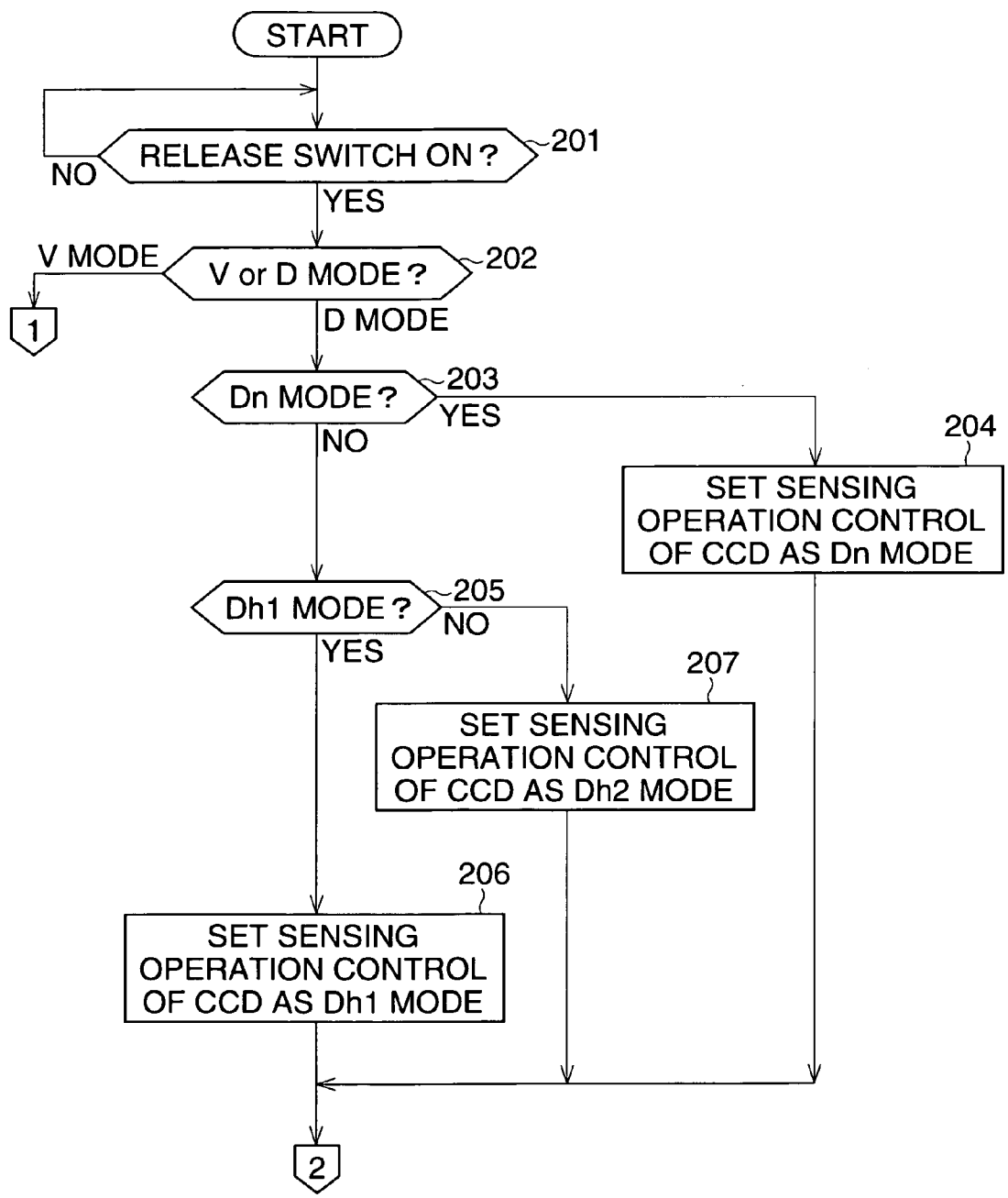
FIGS. 17A, 17B and 17C show a flowchart of the distance information sensing operation of the second embodiment.
Figure 17B:
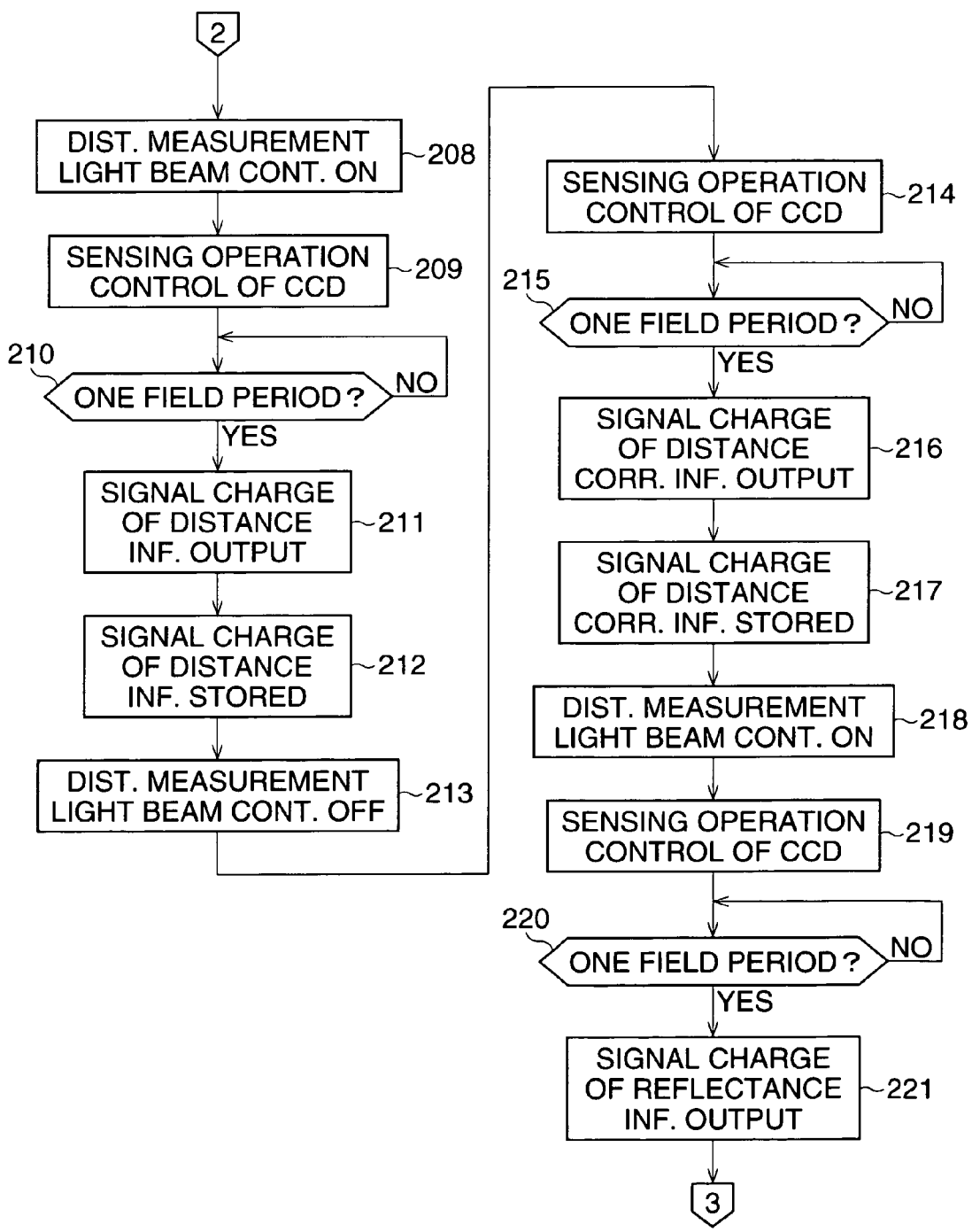
Figure 17C:
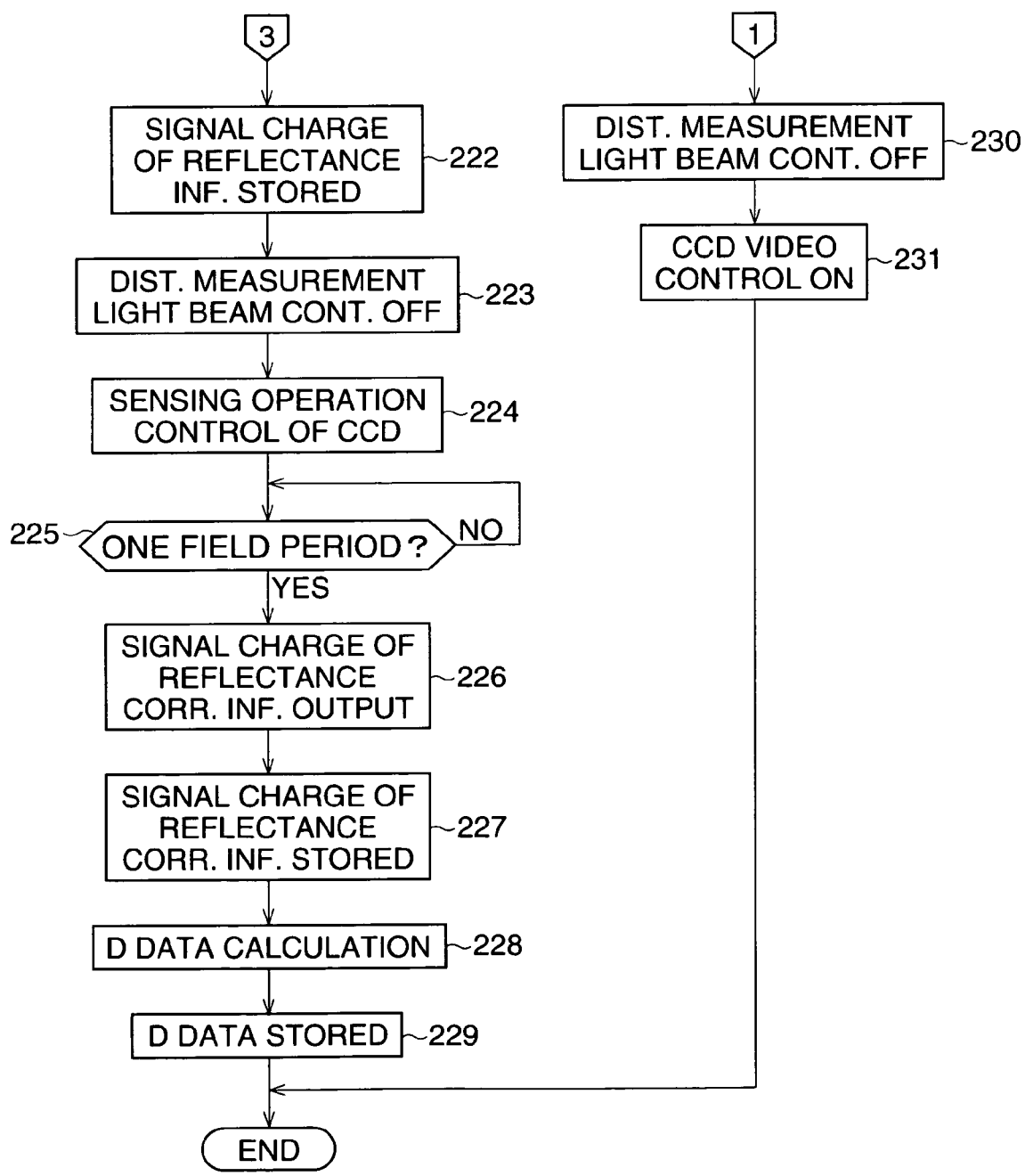

FIG. 17A to FIG. 17C are a flow chart of the distance information sensing operation and image information sensing operation in the second embodiment.

When it is determined at step 201 that the release switch 15 is fully depressed, Step 202 is executed to determine which of the video (V) mode or distance-measurement (D) mode is selected. A change between V mode and D mode is carried out by manually operating the V/D mode switch 18'. When the V/D mode switch 18' is set to one of the Dn mode, Dh1 mode or Dh2 mode, it is determined as D mode.

When it is determined in Step 202 that D mode is selected, in Step 203 through Step 207, it is then determined which of the D modes is selected, Dn mode, Dh1 mode or Dh2 mode, and preparations for a selected mode are carried out. Namely, in Step 203, it is determined whether a selected mode is Dn mode. When Dn mode is selected, in Step 204 a preparation for the distance information sensing operation is made, so as to execute the operation without thinning out any of the photo-diodes in the CCD, or in other words, using all the photo-diodes $51a_1$, $51a_2$ and $51a_3$. When it is determined in Step 203 that a selected mode is not Dn mode, it is then determined whether Dh1 mode is selected. If Dh1 mode is selected, in Step 206, a preparation for the distance information sensing operation is made so as to execute the operation merely with the photo-diodes $51a_1$, and $51a_3$, which results in the photo-diodes of the CCD being thinned out to ⅓ of the horizontal lines of the CCD. Conversely, when it is determined in Step 205 that Dh1 mode is not selected, a preparation for the distance information sensing operation is made in Step 207, so as to execute the operation merely with the photo-diodes $51a_1$, which results in the photo-diodes of the CCD being thinned out to ⅙ of the horizontal lines of the CCD.

Processes in Step 230 and Step 231 are identical to those of Step 125 and Step 126 in the first embodiment. Further, process from Step 208 through Step 229 are similar to the steps from Step 103 through Step 124 in the first embodiment. The process differs in that the photo-diodes used in the distance information sensing operation are selected according to the above selected mode and operations of signal charge output from the CCD 28, which is executed in step 211, 216, 221 and 226.

The signal charge output operations, a vertical and horizontal transfer of the signal charge, executed in step 211, 216, 221 and 226 are explained with reference to FIG. 18 to FIG. 22.

Figure 18:
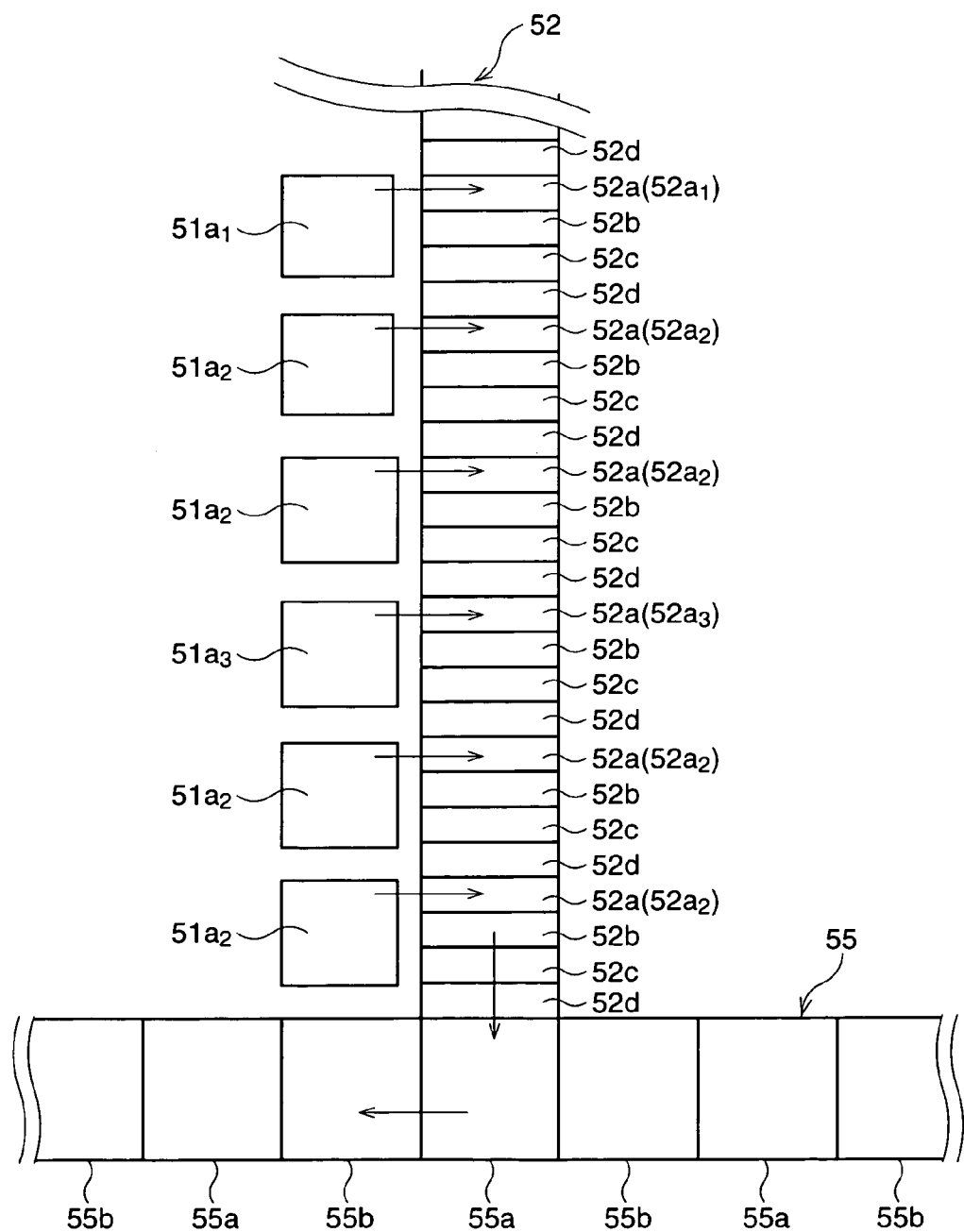
FIG. 18 is a plan view showing a disposition of photo-diodes, a vertical transfer unit and a horizontal transfer unit.

FIG. 18 shows a disposition of the vertical transfer unit 52, the horizontal transfer unit 55 and photo-diodes $51a_1$, $51a_2$ and $51a_3$. However, only one vertical column of the vertical transfer unit 52 and the photo-diodes $51a_1$, $51a_2$ and $51a_3$ are shown. A configuration of the vertical transfer unit and the photo-diodes is the same as the configuration described in FIG. 6 and FIG. 16. The horizontal transfer unit 55 has horizontal transfer electrodes 55a and 55b, which are alternately arranged along a horizontal line. As described above, the signal charges accumulated in the photo-diodes are repeatedly transferred to the vertical transfer unit during one field period and thereby integrated. When the signal charge is transferred from the photo-diodes to the vertical transfer unit, voltage signal, an electric charge transfer signal, is applied to each of the selected groups of the electrodes in accordance with the mode selected by the V/D mode switch, such as Dn mode, Dh1 mode and Dh2 mode. Namely, the vertical transfer electrodes $52a_1$, $52a_2$ and $52a_3$ are individually operated in the above electric charge transferring operation. To the contrary, in a vertical transfer operation, voltage signals applied to the vertical electrodes $52a_1$, $52a_2$ and $52a_3$ are synchronous at all times. Thus, in the following description, reference 52a is used to represent the vertical electrodes $52a_1$, $52a_2$ and $52a_3$ and the electrodes $52a_1$, $52a_2$ and $52a_3$ are treated as a single electrical group. Namely, all the vertical transfer electrodes in the CCD 28 are separated into four groups of the electrodes, which are represented by the reference 52a, 52b, 52c and 52d. The signal charges integrated in the vertical transfer unit 52 are transferred downwardly in sequence along the vertical transfer unit 52 by the voltage signals of four phase driving pulse applied to the vertical transfer electrodes 52a, 52b, 52c and 52d. When the lowermost signal charges are transferred to the horizontal transfer unit 55 where the horizontal transfer electrodes 55a are disposed, driving pulses are output to the horizontal transfer electrodes 55a and 55b, and then the signal charges are horizontally transferred to the left side of the diagram and output from the CCD in sequence.

FIG. 19A, FIG. 19B and FIG. 19C show timing charts of vertical transfer CCD pulses, which are the four phase driving pulses applied to the vertical transfer electrodes 52a, 52b, 52c and 52d, and a horizontal transfer CCD pulse to the horizontal electrodes 55a. FIG. 19A, FIG. 19B and FIG. 19C correspond to the timing charts of Dn mode, Dh1 mode and Dh2 mode respectively. An output timing of the horizontal transfer CCD pulse S50 and S51 is common to the above three modes and the time required for outputting signal charges of one line in the horizontal transfer operation is constant. A transportation of a signal charge from the vertical transfer unit 52 to the horizontal transfer unit 55 is executed during a period $T_H$ when the horizontal transfer CCD pulse S50 is set to a high level.

In Dn mode, all of the photo-diodes in the CCD 28 are used for the distance information sensing operation, and therefore signal charges accumulated in the distance information sensing operation are stored in the vertical transfer unit 52 corresponding to every vertical transfer electrodes 52a, which are 4·n th (n=1, 2, . . . ) electrode from the bottom. The vertical transfer CCD pulses S52, S53, S54 and S55 or the four phase driving pulses are output in turn for one period so as to transfer the signal charges downwardly through the vertical transfer unit, and when the vertical transfer CCD pulse S54 falls, one period of vertical transfer operation ends. With this one period of vertical transfer operation, signal charged stored beneath electrodes 52a and 52b in a certain horizontal line of the CCD 28 are transferred to those of the electrodes 52a and 52b disposed one line below and signal charges stored in the bottom line of the horizontal line are transferred to the horizontal transfer unit 55, namely, beneath horizontal transfer electrodes 55a. Thus, the signal charges transferred to the horizontal transfer unit 55, which correspond to a set of signal charges for one horizontal line, are then transmitted horizontally through the horizontal transfer unit 55 and output from the CCD by the horizontal transfer CCD pulses S51. In the same way, one period of vertical transfer CCD pulses S52, S53, S54 and S55 are output when the horizontal transfer signal S50 is set to high level, and then the horizontal transfer singles S51 are output and each set of the signal charges corresponding to each of horizontal lines in the CCD are output from the CCD sequentially. The above operations are continued repeatedly until output of all the signal charges in the CCD is completed.

In the Dh1 mode, signal charges are only stored beneath the vertical transfer electrodes $52a_1$ and $52a_3$ of the vertical transfer unit 52. Namely, signal charges are only stored beneath 12·n th (n=1,2, . . . ) electrodes from the bottom. Therefore three periods of vertical transfer CCD pulses are needed to transfer a signal charge to the horizontal transfer unit as described in FIG. 19B. Further, in Dh2 mode, signal charges are stored only beneath the electrodes $52a_1$ of the vertical transfer unit, 24·n th (n=1,2, . . . ) electrodes from the bottom, therefore six periods of vertical transfer CCD pulses are needed to transfer a signal charge to the horizontal transfer unit as shown in FIG. 19C. The above signal charges transferred to the horizontal transfer unit by three or six periods of the vertical transfer CCD pulses are then output from the CCD by the horizontal transfer CCD pulses S51, in the same way as in Dn mode.

As described in FIG. 19B and FIG. 19C, in Dh1 or Dh2 modes, three or six periods of the vertical transfer CCD pulses are output during the horizontal transfer CCD pulse S50 in high level. Since the period of the pulse S50 is constant, the time required for outputting one line of detected signal charges is the same in each of the modes. However, in Dh1 mode and Dh2 mode, the number of lines used for detecting the signal charges is thinned out to 1/3 and 1/6 lines. Namely, the number of the horizontal transfer operations required in outputting all of the signal charges in the CCD is decreased to 1/3 or 1/6, thus the time required for outputting all the signal charges detected in the CCD is reduced to 1/3 or 1/6. For example, when the CCD has 1280 pixels in a horizontal line and 1024 pixels in a vertical line (CCD of SXGA), 1024 periods of horizontal transfer CCD pulses S50 and S51 are required in order to output all the signal charges in the CCD. However, in Dh1 mode and Dh2 mode, 342 periods and 171 periods of the horizontal transfer CCD pulses are respectively required for carrying out the same.

FIG. 20 shows timing charts of the distance measurement operation (comprising the distance information sensing operation, distance correction information operation, reflectance information sensing operation and reflectance correction information operation) executed in each of the mode Dn, Dh1 and Dh2. Image signals output S71, S72, S73 and S74 indicate signals output from the CCD during the execution of the distance information sensing operation, the distance correction information operation, the reflectance information operation and reflectance correction information operation, respectively. A detecting period $T_0$ in the Dn mode corresponds to a frame period, which is 1/30 seconds when the NTSC standard is applied. Therefore, 2/15 seconds (133.3 ms), a time period $T_3$, is required in order to execute all of the distance measurement operation. In each of the sensing operations of the distance measurement operations, there is a period $T_1$ in which signal charges accumulated in a photo-diode are repeatedly transferred to a vertical transfer unit so as to integrate them, and a period $T_2$ in which the signal charges integrated in the vertical transfer unit are output from the CCD through the horizontal transfer unit. It requires 3.6 $\mu$s for transmitting a signal charge from a photo-diode to the vertical transfer unit, when the width of the electric charge discharging signal S1 and the electric charge transfer signal S9 are 2 $\mu$s and 1 $\mu$s respectively; a time period between the fall of the electric charge discharging signal S1 and the rise of the electric charge transfer signal S9 is 500 ns; and a time period between the fall of the electric charge transfer signal S9 and the rise of the next electric charge discharging signal S1 is 100 ns, as shown in FIG. 7 for an example. Thus when signal charges are transferred 1000 times in one field period, which corresponds to 1000 times integration, the period $T_1$ becomes 3.6 ms. Note that the period $T_2$, a period for outputting signal charges detected in the CCD, is 1/60 seconds (approximately 16.7 ms), which is one field period in NTSC standard.

On the other hand, in Dh1 and Dh2 modes, one field period is shorter than that of NTSC standard. Although, in Dh1 and Dh2 modes, the period $T_1$ for 1000 times integrations of signal charges is the same as that of Dn mode, periods $T_2'$ and $T_2''$, periods for outputting signal charges detected in the CCD, are 1/3 and 1/6 of the period $T_2$ respectively, since the horizontal lines applied in the distance measurement operation are thinned out to 1/3 and 1/6 of all the horizontal lines in the CCD, which are used in Dn mode. Namely, the period $T_2'$ becomes 5.6 ms and the period $T_2''$ becomes 2.8 ms approximately. Further, when a period from the end of the integration in the vertical transfer unit through the beginning of the vertical transfer operation and a period from the end of the vertical and horizontal transfer operations through the beginning of the signal charges integration prosecuted in the next sensing operations are, for example, 1 $\mu$s, the periods $T_0'$ and $T_0''$ in the Dh1 and Dh2 modes become 9.2 ms and 6.4 ms, respectively. Therefore, time periods $T_3'$ and $T_3''$ required for prosecuting all of the distance measurement operations in Dh1 mode and Dh2 mode become 36.8 ms and 25.6 ms respectively. Consequently, a time required for the distance measurement operation is drastically shortened when the horizontal lines applied for the operation are thinned out, and this enables the three-dimensional image capturing device to detect the distance information of a fast moving subject.

As described above, according to the second embodiment, the advantages of the first embodiment are also obtained. Further, in the second embodiment, since a plurality of distance measurement modes, in which the number of horizontal lines applied in the distance measurement operations differs from one another, are prepared, distance information is sensed with the mode appropriate for subject speed, and precise distance information may be obtained.

Note that, in the second embodiment, similar to the first embodiment, an influence derived from noise, such as ambient daylight, is removed from the distance information of the measurement subject. Nevertheless, in a case where the influence can be neglected, a correction regarding only the reflectance of the surface of the measurement subject is carried out.

Further, in the second embodiment, although the accumulation of signal charge is performed for one field period in Steps 210, 215, 220 and 225, respectively, the accumulation may be carried out for a plurality of field periods.

In the second embodiment, although the horizontal lines of the photo-diodes are separated into three electric groups, they may also be separated into two electric groups or four or more electric groups. Further, in each distance measurement mode of the second embodiment, the horizontal lines used in each corresponding distance measurement operation are disposed every n−1 lines (where n=1,2 and 3), however, horizontal lines applied in a distance measurement operation need not to be disposed regularly for every predetermined line. For example, a distance measurement operation may be operated merely with photo-diodes $51a_2$ or merely with photo-diodes $51a_1$, and $51a_2$.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application Nos. 11-162889 and 11-176968 (filed on Jun. 9 and Jun. 23, 1999, respectively) which are expressly incorporated herein, by reference, in their entireties.

What is claimed is:

1. A three-dimensional image capturing device, comprising:
- a light source that radiates a distance measuring light beam irradiating a measurement subject, the measurement subject reflecting the distance measuring light beam to generate a reflected light beam;
- a plurality of photoelectric conversion elements, configured in a matrix arrangement, that receive the reflected light beam, said photoelectric conversion elements accumulating electric charge corresponding to at least distance information based on an amount of the received reflected light beam;
- a vertical transfer unit that is disposed along each vertical line of said photoelectric conversion elements, said photoelectric conversion elements transferring the accumulated electric charge in a vertical direction;
- a horizontal transfer unit that is disposed near one end of said vertical transfer unit and in parallel with horizontal lines of said photoelectric conversion elements, so that the electric charge is transferred in a horizontal direction;
- an electric charge transfer processor that transfers electric charge accumulated only in photoelectric conversion elements comprising effective horizontal lines, which are disposed every predetermined number of the horizontal lines;
- an electric charge integrating processor that drives said electric charge transfer processor repeatedly and integrates the electric charge accumulated in said photoelectric conversion elements comprising the effective horizontal lines in said vertical transfer unit; and
- a transfer operation control processor that controls said horizontal transfer unit and said vertical transfer unit, so that said horizontal transfer unit is driven only when the electric charge corresponding to the effective horizontal lines is transferred to said horizontal transfer unit,
- wherein the horizontal lines are separated into first, second and third groups, which are arranged in a vertical direction such that an order of first group, second group, second group, third group, second group, second group is repeated.

2. A device according to claim 1, wherein the effective horizontal lines comprise at least one of the groups.

3. A device according to claim 2, wherein each of the plurality of groups shares at least one of the horizontal lines.

4. A device according to claim 3, wherein the plurality of groups comprises at least three groups.

5. A three-dimensional image capturing device, comprising:
- a light source that irradiates a measurement subject;
- a plurality of photoelectric conversion elements, arranged in a matrix, that receive an amount of light reflected from the measurement subject and that accumulate electric charge corresponding the received amount of light said photoelectric conversion elements comprising first photoelectric conversion elements and second photoelectric conversion elements, a number of said second photoelectric conversion elements being less than a number of said first photoelectric conversion elements;
- an electric charge transfer control processor that controls an electric transfer operation, which outputs the electric charge accumulated in said photoelectric conversion elements;
- a distance calculating processor that calculates a distance to the measurement subject based on the amount of electric charge accumulated in said photoelectric conversion elements;
- a first distance measuring processor that drives said electric charge transfer control processor to output the electric charge accumulated in all said photoelectric conversion elements, and calculates the distance corresponding to all said photoelectric conversion elements using said distance calculating processor;
- a second distance measuring processor that drives said electric charge transfer control processor in order to output the electric charge accumulated in selected photoelectric conversion elements of the plurality of photoelectric conversion elements, and calculates the distance corresponding to said selected photoelectric conversion elements using said distance calculating processor; and
- a distance measurement selecting processor that selects one of said first distance measuring processor and said second distance measuring processor, and drives the selected processor;
- wherein said second distance measuring processor comprises:
  - a first high speed mode that drives said electric charge transfer control processor to output electric charge from said first photoelectric conversion elements, and that calculates the distance corresponding to said first photoelectric conversion elements; and
  - a second high speed mode that drives said electric charge transfer control processor to output electric charge from said second photoelectric conversion elements, and that calculates the distance corresponding to said second photoelectric conversion elements; and
- wherein said first high speed mode calculates the distance when the measurement subject is moving at a relatively slow speed and said second high speed mode calculates the distance when the measurement subject is moving at a relatively fast speed.

6. A device according to claim 5, wherein said first distance measuring processor measures a stationary measurement subject and said second distance measuring processor measures a moving measurement subject.

* * * * *